US011450071B2

(12) United States Patent
Stokking et al.

(10) Patent No.: US 11,450,071 B2
(45) Date of Patent: Sep. 20, 2022

(54) ADAPTING ACOUSTIC RENDERING TO IMAGE-BASED OBJECT

(71) Applicants: Koninklijke KPN N.V., Rotterdam (NL); Nederlandse Organisatie Voor Toegepast-Natuurwetenschappelijk Onderzoek TNO, The Hague (NL)

(72) Inventors: Hans Maarten Stokking, Wateringen (NL); Hendrikus Nathaniël Hindriks, The Hague (NL)

(73) Assignees: KONINKLIJKE KPN N.V., Rotterdam (NL); NEDERLANDSE ORGANISATIE VOOR TOEGEPAST-NATUURWETENSCHAPPELIJK ONDERZOEK TNO, 'S-Gravenhage (NL)

( * ) Notice: Subject to any disclaimer, the term of this patent is extended or adjusted under 35 U.S.C. 154(b) by 0 days.

(21) Appl. No.: 17/057,434

(22) PCT Filed: May 23, 2019

(86) PCT No.: PCT/EP2019/063303
§ 371 (c)(1),
(2) Date: Nov. 20, 2020

(87) PCT Pub. No.: WO2019/224292
PCT Pub. Date: Nov. 28, 2019

(65) Prior Publication Data
US 2021/0209855 A1    Jul. 8, 2021

(30) Foreign Application Priority Data
May 23, 2018  (EP) .................................. 18173757

(51) Int. Cl.
*G06T 7/50*   (2017.01)
*G06T 19/00*  (2011.01)
(Continued)

(52) U.S. Cl.
CPC .............. *G06T 19/006* (2013.01); *G06T 7/50* (2017.01); *G06T 7/70* (2017.01); *H04S 7/303* (2013.01);
(Continued)

(58) Field of Classification Search
CPC ........... G06T 19/006; G06T 7/50; G06T 7/70; G06T 2210/61; G06T 2219/024;
(Continued)

(56) References Cited

U.S. PATENT DOCUMENTS 10,869,152 B1 * 12/2020 Walsh ...................... H04S 3/002
2012/0154402 A1 *  6/2012 Mital ..................... G06T 11/206
                                                          345/440

(Continued)

FOREIGN PATENT DOCUMENTS

CN     105792090 A    7/2016
CN     107231599 A    10/2017

OTHER PUBLICATIONS

Google Resonance, http://developers.google.com/resonance-audio (No Date Given).
(Continued)

*Primary Examiner* — Jin Ge
(74) *Attorney, Agent, or Firm* — Hamilton, Brook, Smith & Reynolds, P.C.

(57) ABSTRACT

A method and processor system are provided for adapting an acoustic rendering of an audio source to a visual rendering of an image-based object. Such visual rendering may be in virtual-reality (VR) or in augmented-reality (AR). The image-based object may be modelled, and an audio object
(Continued)

representing the modelled object may be established in an acoustic scene containing the audio source and being associated with the visual rendering. The audio object may be assigned a reverberant and/or absorbent property, and the acoustic rendering may be adapted to the audio object. This way, the acoustic rendering may be adapted to image-based objects, and a user may perceive the acoustic rendering as better matching the visual rendering.

14 Claims, 11 Drawing Sheets

(51) Int. Cl.
G06T 7/70 (2017.01)
H04S 7/00 (2006.01)
(52) U.S. Cl.
CPC .......... *H04S 7/305* (2013.01); *G06T 2210/61* (2013.01); *G06T 2219/024* (2013.01); *H04S 2400/11* (2013.01); *H04S 2400/15* (2013.01)
(58) Field of Classification Search
CPC ...... H04S 7/303; H04S 7/305; H04S 2400/11; H04S 2400/15
USPC ......................................................... 345/633
See application file for complete search history.

(56) References Cited

U.S. PATENT DOCUMENTS

| 2012/0206452 | A1 | 8/2012 | Geisner et al. | |
| 2014/0233917 | A1* | 8/2014 | Xiang | H04S 7/30 386/285 |
| 2014/0270184 | A1 | 9/2014 | Beaton et al. | |
| 2015/0131966 | A1 | 5/2015 | Zurek et al. | |
| 2015/0301592 | A1 | 10/2015 | Miller | |
| 2016/0260441 | A1 | 9/2016 | Muehlhausen et al. | |
| 2017/0039767 | A1 | 2/2017 | Lanier et al. | |
| 2017/0265016 | A1* | 9/2017 | Oh | G06K 9/6215 |
| 2018/0020312 | A1* | 1/2018 | Visser | G06F 3/017 |
| 2018/0160251 | A1* | 6/2018 | Sanger | H04S 3/008 |
| 2019/0130644 | A1* | 5/2019 | Mate | G06T 19/006 |
| 2019/0318510 | A1* | 10/2019 | Eronen | G06T 11/001 |
| 2020/0008004 | A1* | 1/2020 | Eronen | G06K 9/00624 |
| 2021/0076153 | A1* | 3/2021 | Laaksonen | H04S 7/303 |

OTHER PUBLICATIONS

Svensson, "Modelling Acoustic Spaces For Audio Virtual Reality," Proc. 1$^{st}$ IEEE Benelux Workshop on Model based Processing and Coding of Audio (MPCA-2002), Leuven, Belgium, Nov. 15, 2002, pp. 109-116.
Coleman et al., "Object-Based Reverberation for Spatial Audio," Journal of the Audio Engineering Society, vol. 65, No. 1/2, Jan./Feb. 2017, pp. 66-77.
Scheirer et al., "AudioBIFS: Describing Audio Scenes with the MPEG-4 Multimedia Standard," IEEE Transactions on Multimedia, vol. 1, No. 3, Sep. 1999, pp. 237-250.
Scheirer et al., "AudioBIFS: The MPEG-4 Standard for Effects Processing," Presented at the first COST-G6 Workshop on Digital Audio Effects Processing (DAFX '98), Barcelona, Nov. 1998, pp. 1-9.
A Framework for WebVR: https://aframe.io/.
Format for providing LIDAR data: http://www.asprs.org/a/society/committees/standards/LAS_1_4_r13.pdf.
PCT International Search Report and Written Opinion for International Application No. PCT/EP2019/063303, entitled "Adapting Acoustic Rendering to Image-Based Object," dated Jul. 12, 2109.
ISO/IEC FDIS 23090-12:201x, Information Technology—Coded representation of immersive media (MPEG-1)—Part 2 Omnidirectional media format, Dec. 11, 2017.

* cited by examiner

ADAPTING ACOUSTIC RENDERING TO IMAGE-BASED OBJECT

This application is the U.S. National Stage of International Application No. PCT/EP2019/063303, filed May 23, 2019, which designates the U.S., published in English, and claims priority under 35 U.S.C. § 119 or 365(c) to European Application No. 18173757.8, filed May 23, 2018. The entire teachings of the above applications are incorporated herein by reference.

FIELD OF THE INVENTION

The invention relates to a method of adapting an acoustic rendering of an audio source to a visual rendering of an object. The visual rendering is an image-based rendering which is provided to a user, with the visual rendering being one of a virtual-reality (VR) rendering of an image-based representation of a scene which includes the image-based representation of the object, and an augmented-reality (AR) rendering of the image-based representation of the object with respect to a real-life scene.

The invention further relates to a computer program comprising instructions for carrying out the method. The invention further relates to a processor system for generating metadata for use in adapting the acoustic rendering of the audio source to the visual rendering of the scene comprising the object, and to processor system for adapting the acoustic rendering of the audio source on the basis of the metadata. The invention further relates to a computer readable medium comprising the metadata.

BACKGROUND ART

Virtual Reality (VR) involves the use of computer technology to simulate a user's physical presence in a virtual environment. Typically, VR rendering devices make use of Head Mounted Displays (HMD) to render the virtual environment to the user, although other types of VR displays and rendering techniques may be used as well, including but not limited to holography and Cave automatic virtual environments.

VR may be used to render scenes which are represented by three-dimensional (3D) graphics, e.g., defined as a set of vertices, edges, faces, etc.

However, in many cases, it may also be desirable to render an image-based representation of a scene in VR. In such cases, the scene may be represented by a digital image or a tiled or otherwise partitioned set of digital images. For example, the digital image may be a photograph of a real-life scene, or a digital image obtained by Computer-Generated Imagery (CGI) of a virtual scene, etc. In some cases, the digital image(s) may represent an omnidirectional image which may provide a large field of view of the scene, e.g., allowing a user to 'look around' within the scene.

The rendering of such an image-based representation of a scene may involve projecting the image data of the digital image(s) onto a virtual body, such as a sphere, and then rendering from a viewpoint within or facing the virtual body.

For example, in a multiuser communication session in VR, a photo of a meeting room may be used as a 'virtual setting' for the multiuser communication session by projecting the photo onto the inside of a sphere and placing avatars representing the users of the multiuser communication session inside the sphere, thereby providing each user with a view from inside the meeting room. Another example is that an omnidirectional image of a scenic location may be shown in VR to provide a user the impression of actually being present at the scenic location.

A problem, however, of the rendering of image-based representations of scenes in VR is that if a separate audio source is rendered in conjunction with the visual rendering of the scene, a user may experience the acoustic rendering as mismatching the visual rendering and potentially as unrealistic and may thereby obtain a less immersive experience in VR. Here, the term 'separate' refers to the audio source not representing an auditive component of the scene, for example by not having been recorded in the same scene as the scene shown in the visual rendering. An example of such an audio source is the audio recording of one of the users of the multiuser communication session, which may be recorded in the user's home-office environment and then reproduced in VR in the aforementioned virtual setting of a meeting room.

The inventors have recognized that a reason for such mismatching is that in a real-life scene, soundwaves of an audio source within the scene would interact with objects in the scene, for example, by bouncing off the surfaces of such objects. Such interaction may be missing in the abovementioned examples.

A similar problem may also occur in Augmented Reality (AR), in which an image-based representation of an object may be rendered and displayed to augment a user's live view of a real-world scene. For example, a user may wear an AR device, such as AR glasses, while wearing headphones. In many cases, a separate audio source is rendered in conjunction with the visual rendering of the object, such as for example a voice-over providing information on the visually rendered object, or sound generated and/or emitted by the object. Also in such cases, the user also may experience the acoustic rendering as mismatching the visual rendering, e.g., due to the soundwaves of the audio sources not interacting with surface(s) of the object.

It is known to adjust the acoustic rendering of audio sources to a scene which is represented by 3D graphics, e.g., by a set of vertices, edges, faces, etc., for example by using Google's Resonance Audio [1] to simulate how soundwaves of the audio source interact with the 3D graphics-based scene. However, such techniques cannot be directly applied to image-based representations of scenes.

REFERENCES

[1] https://developers.google.com/resonance-audio/

SUMMARY OF THE INVENTION

It would be advantageous to enable adapting an acoustic rendering of an audio source to a visual rendering of an image-based representation of an object.

In accordance with a first aspect of the invention, a method may be provided of adapting an acoustic rendering of an audio source to a visual rendering of an object in a scene. The visual rendering may be provided to a user and may be one of: a virtual-reality rendering of an image-based representation of a scene which includes the object and an augmented-reality rendering of an image-based representation of the object with respect to a real-life scene. In general, the virtual-reality rendering may also be a virtual-reality rendering of an image-based representation of the object in a virtual-reality scene. The method may comprise:

generating metadata associated with the image-based representation of the object, the metadata representing a modelling of the object;

establishing the acoustic rendering of the audio source by:
providing the audio source as a spatial audio source in an acoustic scene, the acoustic scene being geometrically aligned with the visual rendering of the object;
on the basis of the metadata, establishing the object as an audio object in the acoustic scene, the audio object having a reverberant and/or absorbent acoustic property; and
rendering the acoustic scene using a spatial audio rendering technique while adapting the rendering of the acoustic scene to the reverberant and/or absorbent acoustic property of the audio object.

In accordance with a further aspect of the invention, a transitory or non-transitory computer-readable medium may be provided. The computer-readable medium may comprise a computer program, and the computer program may comprise instructions for causing a processor system to perform the method.

In accordance with a further aspect of the invention, a transitory or non-transitory computer-readable medium may be provided. The computer readable medium may comprise metadata associated with an image-based representation of an object. The metadata may define at least part of a geometry of the object and indicate a reverberant and/or absorbent acoustic property of the object.

In accordance with a further aspect of the invention, a processor system may be provided for generating metadata for use in adapting an acoustic rendering of an audio source to the visual rendering of an object.

The processor system may comprise:
a communication interface. The communication interface may be configured to communicate with a receiver which may be configured to establish the acoustic rendering of the audio source by providing the audio source as a spatial audio source in an acoustic scene, the acoustic scene being geometrically aligned with the visual rendering of the object; and
a processor. The processor may be configured to:
generate metadata associated with the image-based representation of the object, the metadata may represent a modelling of the object; and
via the communication interface, may provide the metadata to the receiver to enable the receiver to establish the object as an audio object in the acoustic scene, the audio object having a reverberant and/or absorbent acoustic property.

In accordance with a further aspect of the invention, a processor system may be provided for adapting an acoustic rendering of an audio source to the visual rendering of an object. The processor system may comprise:
a communication interface. The communication interface may be configured to receive metadata associated with the image-based representation of the object, the metadata may represent a modelling of the object;
an audio processor. The audio processor may be configured to establish the acoustic rendering of the audio source by:
providing the audio source as a spatial audio source in an acoustic scene, the acoustic scene being geometrically aligned with the visual rendering of the object;
on the basis of the metadata, may establish the object as an audio object in the acoustic scene, the audio object having a reverberant and/or absorbent acoustic property; and
rendering the acoustic scene may use a spatial audio rendering technique while adapting the rendering of the acoustic scene to the reverberant and/or absorbent acoustic property of the audio object.

The above measures involve generating metadata which represents a modelling of the object which is to be visually rendered in VR or AR. The object itself may be represented by image data, e.g., by pixels, voxels, etc. The image-based representation is typically based on a capture of the object by one or more cameras, such as 2D, 3D, 6DOF, light field or other image capture, which may be pre-recorded or may be captured live, for example as a still image or video stream. Modelling such an object may refer to generating data which explicitly defines a geometry of the object, or which at least is indicative of the geometry. Thereby, the metadata may provide a more explicit indication of the geometry of the object than the image data itself, in which the geometry of the object may only be apparent to a human or machine-learned observer.

Here, the term 'geometry' may at least refer to an approximate shape of the object and may in some embodiments also include an approximate size of the object, an approximate position relative to the scene and/or an approximate orientation relative to the scene. Of course, instead of providing an approximate indication of said properties, the metadata may in some embodiments also provide a precise indication. For example, the metadata may provide a list of coordinates representing the geometry of the object. In some embodiments, the metadata may represent a detailed 'conversion' of the object from image data into computer graphics, e.g., defining a set of vertices, edges, faces, etc. detailing the object. In many other embodiments, the metadata may only provide a coarse approximation of the object, for example by only modelling major surfaces of the object. For example, if the object is a room, the metadata may define a box-shaped representation of the room, thereby omitting details such as, e.g., window panes or alcoves present in the room.

In some embodiments, the metadata may be generated by a sender and provided to a receiver which establishes the acoustic rendering of the audio source and which may in some embodiments also establish the visual rendering of the object. The receiver may for example be a VR or AR device, or a part of a VR or AR rendering system. The sender may, for example, be a server used for content distribution or a workstation used for content authoring. The metadata may be 'sent' from the sender to the receiver via a network or distributed physically via a computer readable medium. In some embodiment, the metadata may be generated by or at the receiver, or by a network node or other network entity between the sender and the receiver.

The metadata may be associated with the image data of the object, for example, by being included in a same data container as the image data of the object, such as a same media stream. Another example is that the metadata may contain an identifier of the data container of the image data of the object, such as a Universal Resource Locator (URL), thereby allowing the metadata to be retrieved and associated with the image data. Yet another example is that the metadata may be included in a manifest file which is associated with the image data, or that it may be included in a service announcement, e.g., in an Electronic Program Guide (EPG). Various other means of association are equally conceivable. For example, in some embodiments, the image data may link to the metadata. The receiver may thereby associate the metadata to the image data of the object, and thereby also to a particular acoustic rendering which is to be established together with the visual rendering of the object's image data.

The receiver may then establish the acoustic rendering of the audio source by providing the audio source as a spatial audio source in an acoustic scene which is geometrically aligned with the visual rendering of the object. The audio source itself may in many embodiments represent mono audio, which may preferably be recorded in an anechoic manner or alternatively may be processed using a reverb-removal (or 'de-reverb') algorithm. The phrasing 'providing the audio source as a spatial audio source' may refer to the audio source being represented in the acoustic scene as a sound source having a position and optionally one or more spatial properties such as a directivity, etc. Conceptually, such a representation may be seen as establishing a virtual speaker in the acoustic scene at a particular location. Furthermore, the term 'geometrically aligned' may refer to a particular spatial relation being presumed to exist between the video reproduction device, e.g., the display reproducing the visual rendering, and the audio reproduction device, e.g., the speaker(s) reproducing the acoustic rendering, and the acoustic scene being established in accordance with this predetermined spatial relation, as is known per se in the field of VR/AR.

The receiver may then use the metadata to represent the imaged object as an audio object in the acoustic scene. Here, the term 'audio object' may refer to a spatial representation of an object in an acoustic scene. For that purpose, a spatial audio rendering technique may be used which allows such spatial representations of objects to be defined in an acoustic scene while having reverberant and/or absorbent acoustic properties, such as the aforementioned Google Resonance Audio [1]. By doing so, the object shown in the visual rendering may be represented, either coarsely or precisely, in the accompanying acoustic scene. Effectively, the image-based object is provided with a representation in the acoustic domain. By being represented in the acoustic scene, the audio object may influence the acoustic rendering of the audio source. For example, soundwaves of the spatial audio source may 'bounce off' the object in an at least coarsely similar way as they would do in real-life. Accordingly, the acoustic scene containing the spatial audio source may be rendered while adapting to the reverberant and/or absorbent acoustic property of the audio object, thereby simulating the acoustic scene as if it were a real-life scene. A result of the acoustic rendering, being for example the output of a 'virtual microphone' placed in the acoustic scene, may then be played-out to a user viewing the visual rendering of the object.

Accordingly, the user may be provided with an acoustic rendering in which the presence of the object can be 'acoustically perceived', albeit most likely not in a conscious but at least an unconscious manner. The acoustic rendering may thus be perceived as more realistic, in that it may better match the visual rendering being shown to the user. In the aforementioned specific example of multiuser communication in VR with a meeting room as 'virtual setting', the voices of participants may sound (more) as if they were actually located in the meeting room, e.g., by reflections of their voices being present which coarsely correspond to the shape, size and possibly the materials of the walls of the meeting room. By the acoustic rendering better matching the visual rendering, the VR/AR session may be perceived as more immersive.

In an embodiment, the object may be a room having at least one wall, and the metadata may define at least part of a geometry of the room, for example, by defining a box model representing the room. Rooms are acoustically prominent objects by having one or more walls which are relatively large surfaces by which soundwaves may be reflected. In many cases, these walls may be the most prominent acoustic objects in a scene. Accordingly, by modelling a room and taking the acoustic properties of its walls into account in the acoustic rendering, the acoustic rendering may better match the visual rendering, in many cases more so than if another non-room object were to be modeled instead. In some embodiments, the geometry of the room may be approximated by defining a box model representing the room. An advantage of a box model is that it may require little data and nevertheless may allow the walls of the room to be sufficiently accurately modelled. Such a box model may provide a standardized way of defining rooms and similar objects in the metadata.

In an embodiment, the image-based representation of the scene may be an omnidirectional image. Here, the adjective 'omnidirectional' may refer to the image providing an immersive experience when displayed to the user. For such images, it may be particularly valuable to ensure or enhance immersion by matching the acoustic rendering of the audio scene to the visual rendering of the scene. A specific example is that the omnidirectional image may provide an at least 180-degree view of the scene. The omnidirectional image may even provide a larger view of the scene, e.g., a full 360 degrees, thereby providing an even more immersive experience to the user. Such types of omnidirectional images are also known as (semi-)spherical images.

In an embodiment, the image-based representation of the scene may be associated with a first axis system, the scene may have a default orientation in the first axis system, the metadata may comprise one or more coordinates defining at least part of a geometry of the object, and the method may comprise establishing a spatial correspondence between the first axis system and the one or more coordinates, and establishing the object as the audio object in the acoustic scene based on the spatial correspondence. There may be a need to align the placement of the audio object in the acoustic scene with the visual rendering, for example, to ensure that a wall which is seen straight ahead by the user on a display is also present straight ahead in the corresponding acoustic scene. For that purpose, the metadata may be generated to have a known spatial relationship with the image-based representation of the scene. On the basis of this known spatial relationship, the audio object may then be placed in the acoustic scene. To enable such alignment, the scene may have a default orientation in the digital image. Such a default orientation may also be referred to as 'default pose', 'initial pose', 'initial orientation', etc. and may be standardized, for example as defined by the MPEG Omnidirectional Media Format. It may thus be assumed that the scene is oriented in accordance with such a default orientation. This may also at least in part indicate the orientation of the object within the digital image. For example, if the object is a room, the default orientation may approximately indicate where the floor (near the 'ground'), the ceiling (near the 'sky') and the walls (in between the floor and ceiling) are located in the digital image. Additionally or alternatively, the orientation of the object in the scene may also be detected by image analysis, or may be defined by the metadata, or may be assumed, e.g., on the basis of a standardized representation of the object in the scene. For example, it may be standardized that a room's length axis is shown at 0 degrees (or 'north') in case the image is an equirectangular projection. A spatial correspondence may therefore be established between an axis system associated with the digital image and coordinates of the metadata, so as to allow the geometry of the object to be mapped to the axis system of the image and thereby the placement of the audio object on the basis of the metadata in the acoustic scene to be at least approximately aligned with the visual rendering of the object within the scene.

In an embodiment, generating the metadata may comprise defining at least part of the geometry of the object as coordinates in a second axis system which is different from the first axis system, determining the spatial correspondence between the first axis system and the second axis system, and generating the metadata, or generating further metadata associated with the metadata, to indicate the spatial correspondence. If the metadata uses a different axis system than the axis system associated with the image-based representation of the scene, the metadata may be generated to indicate the spatial correspondence between both axis systems, or additional separate metadata may be generated for this purpose. Such a spatial correspondence may be defined in various ways, for example, as a spatial transformation such as a rotation. For example, the metadata may define a rotation using one or more vectors, which rotation may then be applied at the receiver to the coordinates defining the geometry of the object. Alternatively, the rotation or other type of spatial transformation may be applied to the image data.

In an embodiment, generating the metadata may comprise defining the one or more coordinates in the first axis system. The geometry may also be defined directly in the axis system associated with the image-based representation of the scene. This may have the advantage that the geometry of the object may be directly related to the image-based representation of the scene, without needing further alignment.

In an embodiment, generating the metadata may comprise analyzing one or more of the image-based representation of the scene, the image-based representation of the object, and depth information associated with either image-based representation, using an image analysis technique or a computer vision technique to obtain a modelling of the object. It is known per se to detect geometries of objects from image data. Such techniques may be used to generate the metadata in an automated or at least semi-automated manner. Additionally or alternatively to analyzing the image data, also depth information associated with the image data may be analyzed, if available. For example, such depth information may be available explicitly, e.g., in the form of a depth map, or implicitly. An example of the latter is an image-based representation of the scene and/or object in the form of a pair of stereo images, e.g., representing a left-eye and right-eye viewpoint. In such stereo images, depth information is implicitly present in the form of disparity between both stereo images.

In an embodiment, generating the metadata may comprise obtaining user input indicative of a geometry of the object via a user interface from a user. Accordingly, the metadata may be generated manually or semi-automatically based on the user input. For example, the metadata may be generated by a user operating a content authoring workstation. Such a workstation may allow the user to view the image-based representation of the scene and to provide input representing a modelling of the object in the scene. For example, the user may manually specify one or more parameters of a box model representing the room. Additionally or alternatively, such user input may be used to adjust an automatic estimate of the object's geometry.

In an embodiment, generating the metadata may comprise indicating the reverberant and/or absorbent acoustic property, for example by indicating a material of the object or by directly defining the reverberant and/or absorbent acoustic property. The acoustic rendering may be perceived as being more realistic if the acoustic properties of the object, and in particular those of its surface(s), are realistically modelled in the acoustic scene, instead of, for example, default properties being assumed. For that purpose, the metadata may specify a material of the object, and in particular of its surface(s), which may be indicative of a reverberant and/or absorbent acoustic property. For example, the material may indicate whether the material is highly absorbent or rather highly reflective of soundwaves. In some embodiments, the material may also indicate the reverberant and/or absorbent acoustic properties in a frequency-specific manner. In some embodiments, the reverberant and/or absorbent acoustic properties may be specified directly in the metadata, e.g., as a table setting out frequency against absorption coefficient or in any other suitable manner.

In an embodiment, the metadata may be generated at a server and the metadata may be provided to a receiver configured to establish the acoustic rendering of the audio source. In an embodiment, the audio source may represent audio of a multiuser communication session, and the image-based representation of the scene may represent a virtual setting of the multiuser communication session.

It will be appreciated by those skilled in the art that two or more of the abovementioned embodiments, implementations, and/or aspects of the invention may be combined in any way deemed useful.

Modifications and variations of the method, the processor system(s), the metadata and/or the computer program, which correspond to the modifications and variations described for another one of said entities, can be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

Figure 1:
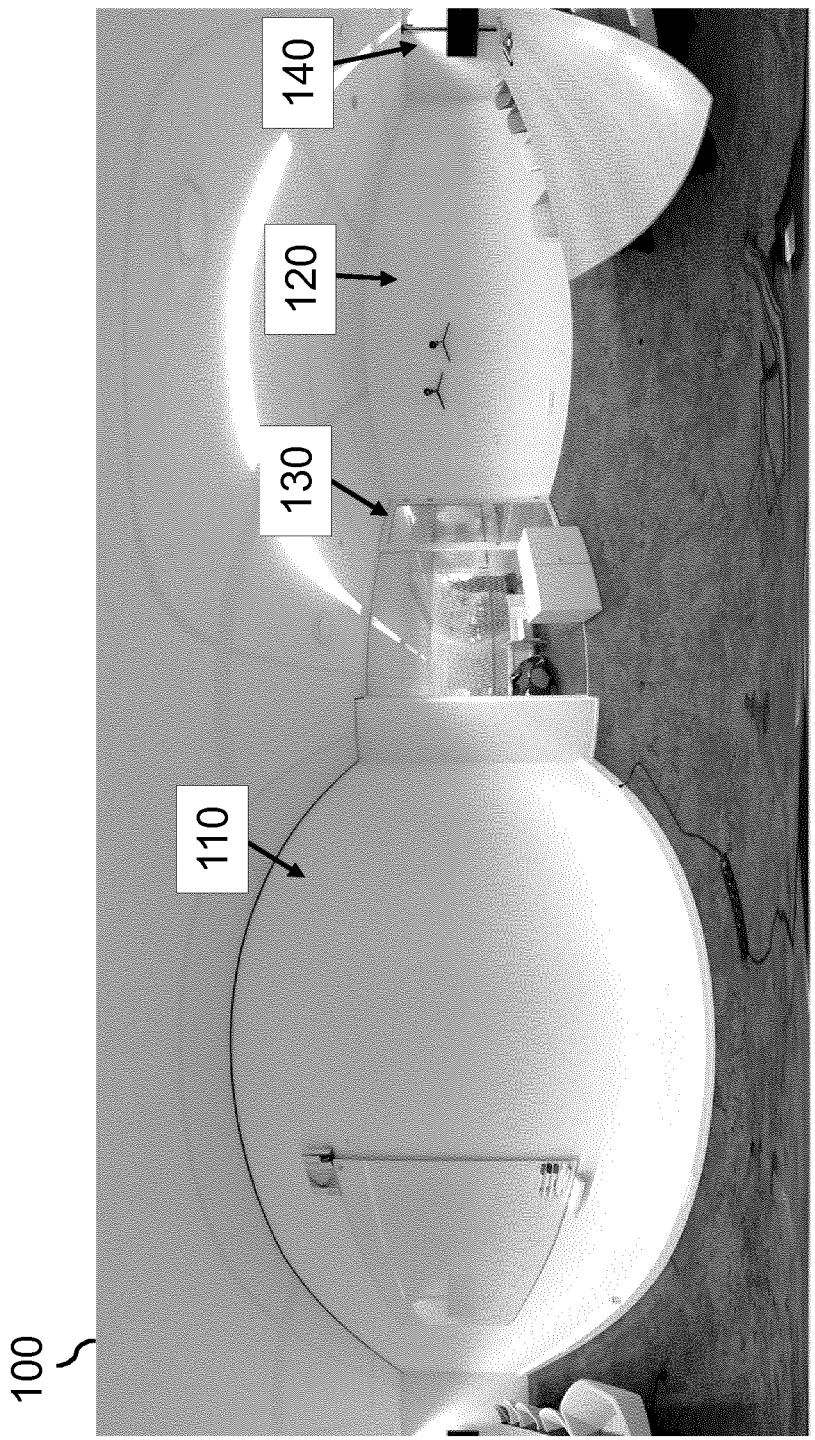
FIG. 1 shows an omnidirectional image acquired within a room.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

100 omnidirectional image of room
110, 120 imaged wall
130 imaged door
140 imaged wall-mounted display
105 imaged room as perceived in virtual reality
115, 125 imaged room wall as perceived in virtual reality
135 imaged door as perceived in virtual reality
145 imaged display as perceived in virtual reality
200 virtual reality environment
210 omnidirectional image projected onto virtual body
220, 222 avatar
300 virtual camera representing observer
310 viewing angle of virtual camera
400 acoustic scene
410 virtual microphone representing observer
420 virtual speaker representing spatial audio source
422 soundwaves
430 audio object representing modelling of imaged room
432, 434 reflected soundwaves
440 audio object representing imaged object
442 reflected soundwaves
500 remote user
505 microphone
510 processor system
515 audio data
520 real-life scene
525 camera
530 processor system
535 image data+metadata
540 network
545 processor system
550 head mounted display
555 rendered virtual reality environment
600 server
610 image data
612 data container
615 audio data
620, 622 metadata
630 network
640 processor system
650 head mounted display
655 rendered image data
660 headphones
665 rendered audio data
700 processor system
710 communication interface
712 output data
720 processor
730 database
800 processor system
810 communication interface
812 input data
820 video processor
822 rendered image data
825 display
830 audio processor
832 rendered audio data
835 speaker
900 method of adapting acoustic rendering to visual rendering
910 generating metadata
920 establishing acoustic rendering
925 providing spatial audio source
930 establishing imaged object as audio object
935 rendering acoustic scene
950 computer readable medium
960 non-transitory data
1000 exemplary data processing system
1002 processor
1004 memory element
1006 system bus
1008 local memory
1010 bulk storage device
1012 input device
1014 output device
1016 network adapter
1018 application

DETAILED DESCRIPTION OF EMBODIMENTS

Many of the following embodiments are described within the context of multiuser communication in VR in which an image-based representation of a room is used as a 'virtual setting'. It will be appreciated, however, that the technical measures described with these embodiments may apply to any type of VR application involving the visual rendering of an image-based representation of an object and the acoustic rendering of an audio source. Examples of such applications include, but are not limited to, VR-based gaming and professional applications in the fields of education, construction, health care, entertainment, etc. In addition to VR applications, also AR applications are conceived in which an image-based representation of an object is overlaid or in another manner displayed together with a real-life scene.

FIG. 1 shows an omnidirectional image 100 which has been acquired within a room, more specifically a meeting room. The imaged room is shown to comprise walls 110, 120, a door 130, a wall-mounted display 140, etc. Such omnidirectional images are known per se, and may provide a larger view of a scene, for example a 180-degree view or, as in the example of FIG. 1, a 360-degree view. Typically, the field of view shown by an omnidirectional image is spherical but is represented within the rectangular canvas of an image by means of a projection. The omnidirectional image 100 of FIG. 1 shows the result of equirectangular projection. Other projections may be used as well, such as skybox projections (also referred to as cube maps).

Omnidirectional images are frequently viewed in Virtual Reality. Virtual Reality (VR) generally involves the use of computer technology to simulate a users physical presence in a virtual reality environment (which is henceforth also simply referred to as 'virtual environment'). Typically, VR rendering devices make use of Head Mounted Displays (HMD) to render the virtual environment to the user, although other types of VR displays and rendering techniques may be used as well, including but not limited to holography and Cave automatic virtual environments.

Generally, rendering an omnidirectional image involves projecting image data of the omnidirectional image onto a virtual body, such as on the inside of a sphere, semi-sphere, cube, box or any other geometrical primitive, and rendering the omnidirectional image from a viewpoint within or facing the virtual body. Here, the virtual body may be a geometric construct, which may for example be defined by a set of coordinates or by one or more parameters (such as the radius defining the size of a sphere) or by a mesh representing the virtual body and which may be 'virtual' by the body not being explicitly rendered but rather used as projection surface for the image data. For example, a 360° video is may be created by stitching multiple images together, e.g., two 180° images captured using fisheye lenses. When a 360° video is to be rendered, the images are typically mapped onto (the inside of) a virtual body, which may be a sphere, a box or other geometrical primitive. Having done so, the omnidirectional image may be rendered from a viewpoint within or facing the virtual body. As such, the image data is shown to the user, while the virtual body itself is normally not visible, with the possible exception of rendering artifacts.

To project the image(s) onto the virtual body, a projection may be used. Such a projection may involve a coordinate mapping from the typically rectangular coordinates of the image(s) to a coordinate system associated with the virtual body. For example, if the virtual body is a sphere and associated with a spherical coordinate system, the coordinate mapping may map coordinates from the rectangular coordinate system of the image(s) to the spherical coordinate system, or vice versa.

The above-described display of omnidirectional images in VR is known per se, for example, from so-called 'Photo Sphere Viewer' applications in VR.

Figure 2:
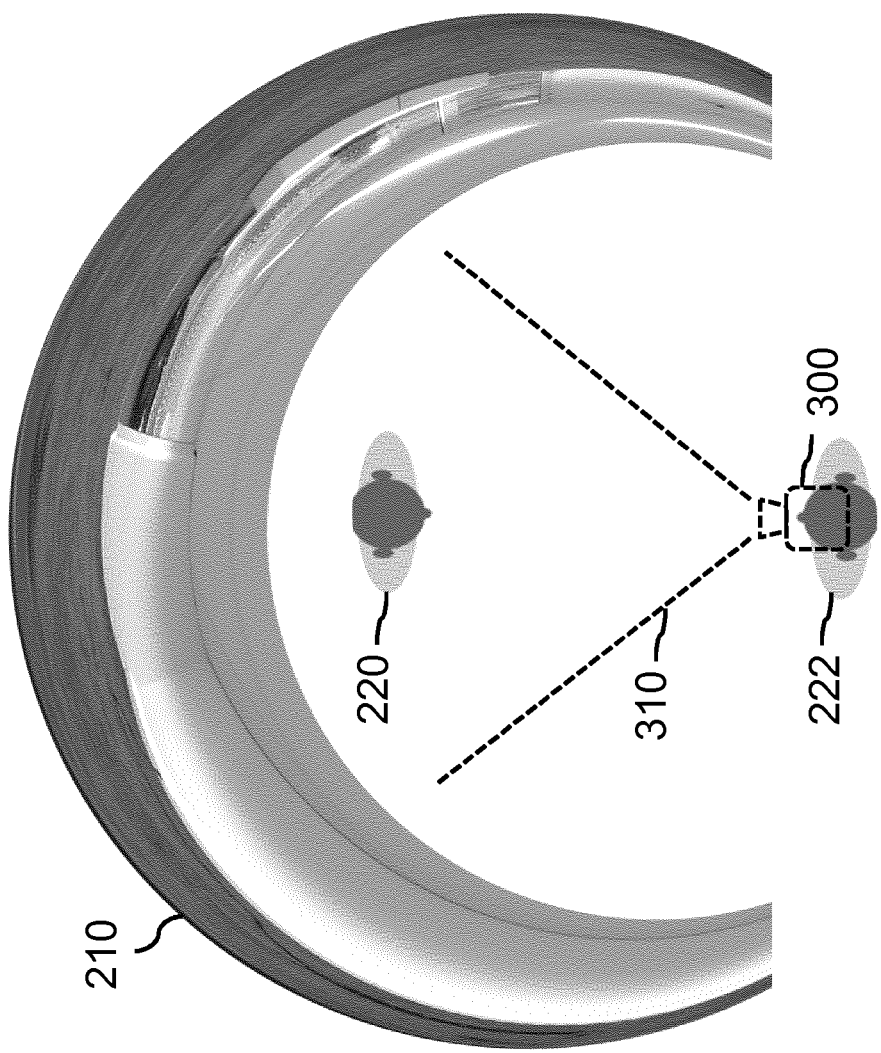
FIG. 2 illustrates a multiuser communication session in virtual reality in which users are represented by avatars in a virtual reality environment, and in which the omnidirectional image of the room is used as a 'virtual setting' of the communication session by being projected onto the inside of a sphere surrounding the users.

FIGS. 2-5C show an example of another application, in which the omnidirectional image of FIG. 1 is used as a virtual setting of a multiuser communication session in VR. FIG. 2 schematically shows the omnidirectional image of FIG. 1 having been projected 210 on the inside of a sphere. Participants in the communication session, which are henceforth also simply referred to as 'users', may be represented by avatars within the virtual environment, while communicating via voice, e.g., using a microphone and speakers, and possibly by nonverbal communication. Here, the term 'avatar' refers to a representation of the user within the virtual environment, which may include representations as real or imaginary persons, real or abstract objects, etc. Such representations may be image-based, e.g., by an avatar showing or being represented by an image or video of a user, or computer graphics-based or a combination of both.

FIG. 2 shows two of such avatars 220, 222 which are placed within the virtual environment 200, and specifically within the sphere 210 onto which the omnidirectional image is projected. Thereby, the imaged meeting room may provide a 'virtual setting' of the communication session. The virtual environment 200 may then be rendered and displayed to one or more of the users. Such visual rendering may take place from the perspective of a user's avatar. This is shown schematically in FIG. 2 by a virtual camera 300 representing the viewpoint of one of the users being overlaid over its avatar 222. The field of view of the camera 310 may correspond to the field of view shown to the user, e.g., using an HMD. The orientation of the virtual camera 300 may be controlled by the user, for example based on so-called 3-Degree of Freedom (DoF) tracking of the user's head or HMD, thereby allowing the user to freely look around in the virtual environment 200. In some embodiments, the user may also be able to move around in the virtual environment, e.g., based on additional input by mouse or joystick or keyboard or by so-called 6-DoF tracking of the user head or HMD.

Figure 3:
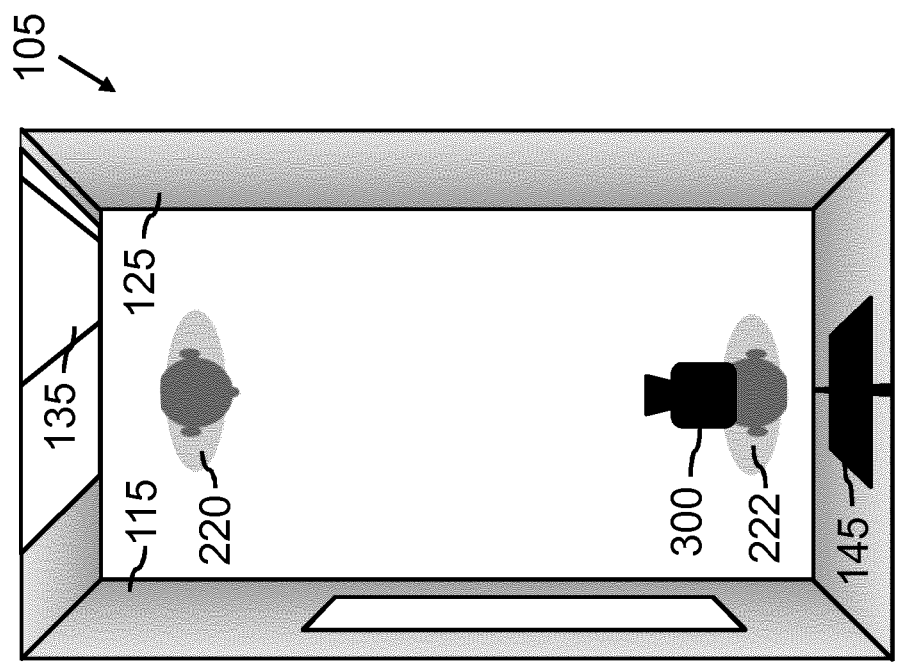
FIG. 3 shows the imaged room as perceived by one of the users in the virtual reality environment.

FIG. 3 shows the imaged room 105 as generally perceived by the users in the virtual reality environment. Here and elsewhere, the adjective 'imaged' with reference to an object refers to an image-based representation of the object. With continued reference to FIG. 3, even though the omnidirectional image is projected onto a sphere or other geometric primitive, the user's will normally perceive the room, or in general the imaged scene or object, in accordance with its original shape, being in this example a rectangular shape. Specifically, the user represented by the virtual camera 300 may see the avatar 220 of another user, the walls 115, 125 of the room and a door 135, and when turning around, a wall-mounted display 145. It is noted that with the possible exception of the avatar 220, these objects 115-145 are represented by image data in the virtual environment, rather than, for example, by computer graphics.

The virtual reality environment may be accompanied by an acoustic scene which may be an audio component of the virtual reality environment and which may be geometrically aligned with the environment's visual component. This may be elucidated with reference to FIG. 4 which schematically shows such an acoustic scene 400 in which the user associated with avatar 220 of FIG. 3 is represented by an audio source 420, which by way of analogy is shown and further referred to as a loudspeaker 420 which emits soundwaves 422 in the acoustic scene. Namely, the audio source 420 may reproduce audio (e.g., speech) recorded of the user, for example in real-time, to communicate with the other user in the virtual environment. The other user is represented by a virtual microphone 410, being the audio equivalent of the virtual camera 300 of FIG. 3. The virtual microphone 410, similarly to the virtual camera 300 of FIG. 3 but now for audio rather than video, may be used to capture the audio within the acoustic scene 400 at a particular spatial position, with the captured audio then being played-out to the respective user, for example, via (stereo) headphones.

Figure 4:
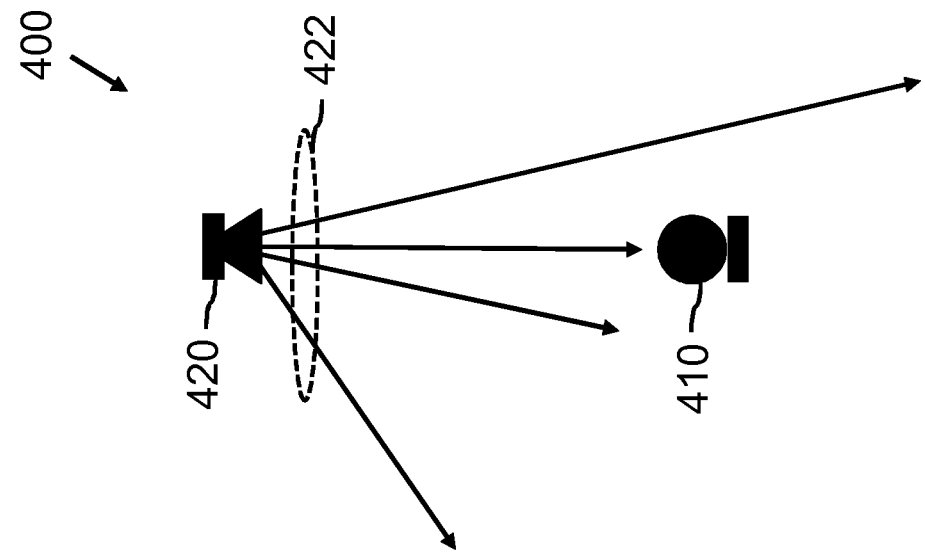
FIG. 4 shows an acoustic scene which represents an auditory part of the virtual reality environment, illustrating how sound recorded of a user is reproduced by a virtual speaker which is captured by a virtual microphone representing another user.

Although not shown explicitly in FIG. 4, it will be appreciated that normally each of the users is represented both by a virtual speaker in the acoustic scene to produce the user's speech or other audio in the acoustic scene, as well as by a virtual microphone to obtain an acoustic rendering of the acoustic scene from the perspective of the respective user. Such rendering of an acoustic scene is known per se.

Figure 5B:
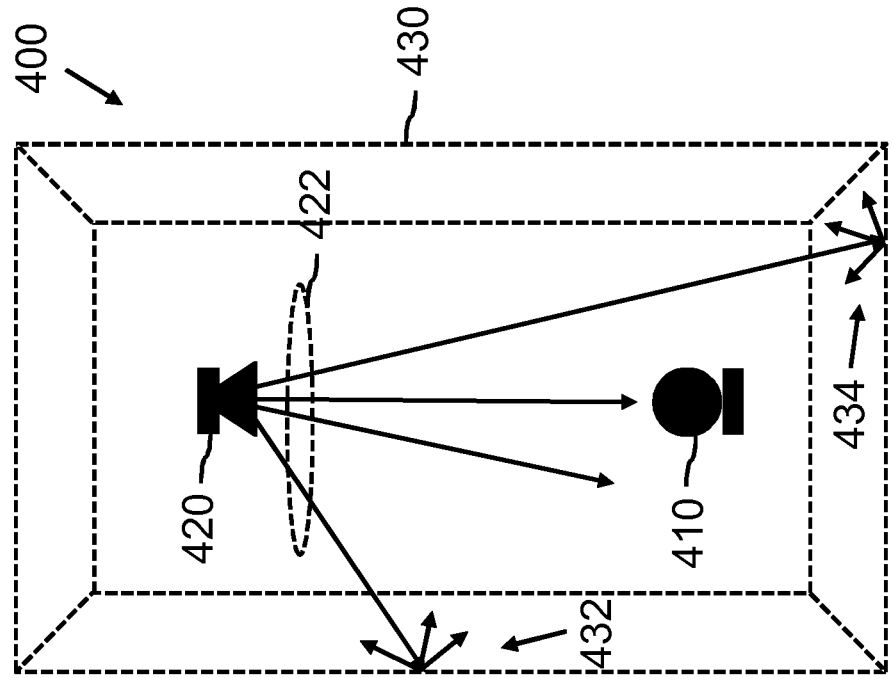
FIG. 5B shows an audio object being provided in the acoustic scene which represents the imaged room, with the audio object having a reverberant and/or absorbent acoustic property causing soundwaves of audio sources to be reflected.
Figure 5A:
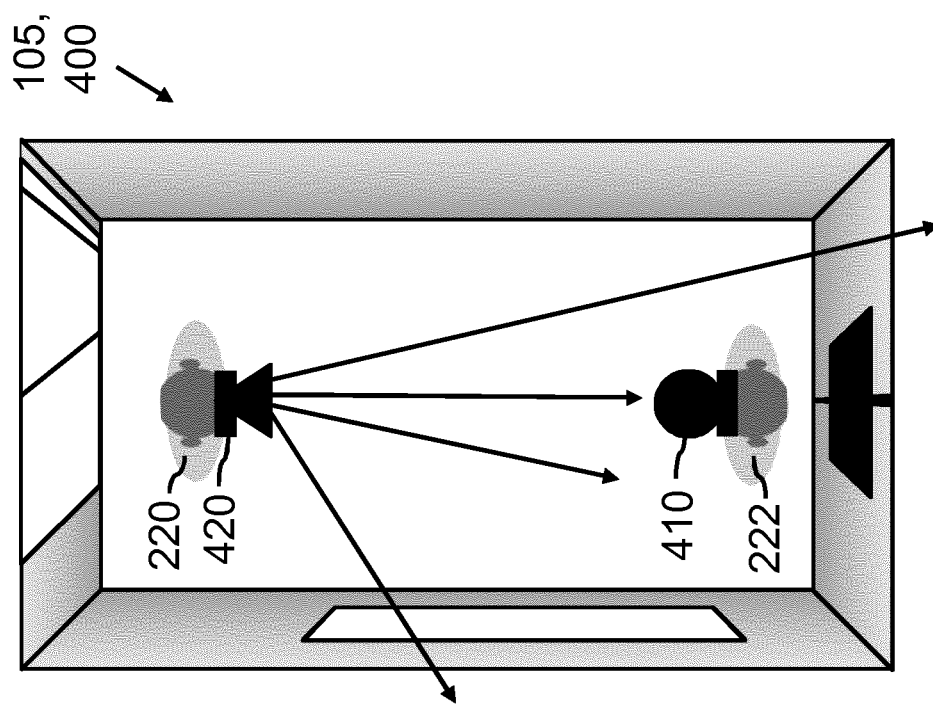
FIG. 5A illustrates the alignment of the visual rendering of the virtual reality environment and the acoustic rendering of the accompanying acoustic scene, while illustrating why such acoustic rendering may be perceived as unrealistic.

The acoustic and visual components of the virtual reality environment may be rendered in an aligned manner, which is shown symbolically in FIG. 5A by the acoustic scene 400 overlying the imaged room 105 such that the position of the virtual loudspeaker 420 is matched to the position of the avatar 220 and the position of the virtual microphone 410 is matched to the position of the avatar 222 in the same manner as the position of the virtual camera 300 is matched to said avatar 222 in FIG. 3. As a result, the user associated with the avatar 222 will perceive speech recorded of the other user as originating from the avatar 220. Such aligned rendering of an acoustic and visual component of a virtual reality environment is known per se.

However, in the example of FIG. 5A and others, the rendered acoustic scene may be perceived to mismatch the visual component of the virtual reality environment. Namely, as shown in FIG. 5A, soundwaves originating from the virtual loudspeaker 420 do not interact with the image-based objects which are seen by the users. Such interaction normally causes soundwaves to be reflected, resulting in echo or reverb, or absorbed, with the characteristics of the reflection or absorption being possibly frequency- and/or phase-dependent. In the example of FIG. 5A, the soundwaves thus do not bounce off the walls of the imaged room 105 as they would do in real-life. Thereby, the user of avatar 222 may only hear direct ('primary') soundwaves, but no 'secondary' soundwaves reflected from objects in the imaged room 105.

To obtain a more realistic rendering of the acoustic scene, one or more image-based objects which are shown in the virtual environment may be modelled, and based on their modelling, reproduced as audio objects in the acoustic scene, with the audio objects having a reverberant and/or absorbent acoustic property. In some embodiments, the acoustic property which is assigned to an audio object may approximate that of the 'real-life' object. The acoustic scene may then be rendered using a spatial audio rendering technique in which the rendering of the acoustic scene is adapted to the reverberant and/or absorbent acoustic property of the audio object.

Figure 6:
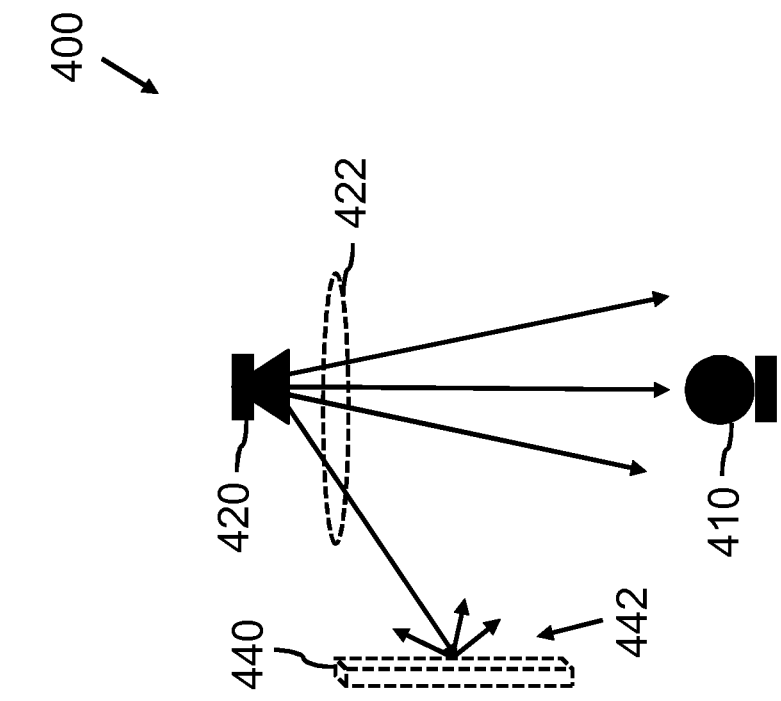
FIG. 6 shows an acoustic scene comprising an audio object, wherein the audio object represents a modelling of an imaged object other than a room.
Figure 5C:
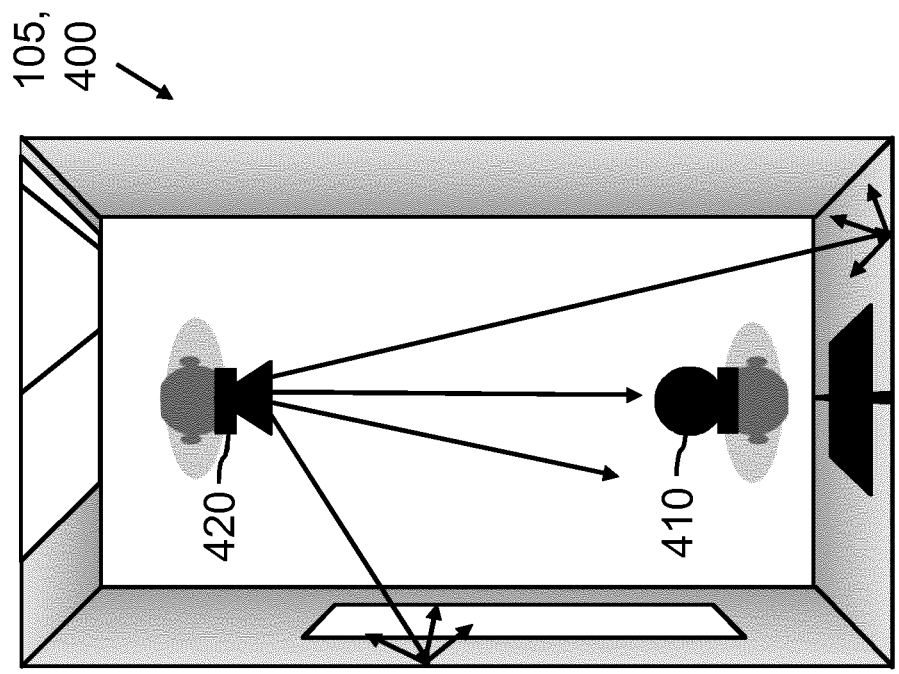
FIG. 5C illustrates the acoustic rendering with the audio object being aligned with the visual rendering such that the audio object representing the imaged room in the acoustic scene is perceived to be spatially aligned with the visual rendering.

FIGS. 5B and 5C illustrate such modelling for the imaged room of FIGS. 1-5A, while FIG. 6 illustrates such modelling for a separately imaged object, which may for example be shown as an overlay in AR. In general, the modelling may be represented by metadata, which metadata may be generated, formatted, transmitted, etc., in various ways, as will also be described with reference to FIGS. 7-9.

FIG. 5B shows a result of the room having been modelled and reproduced as an audio object 430 in the acoustic scene 400. In this example, the room has been approximated by a box model, with the room's audio object then being established as a geometric model in the audio environment based on the parameters of the box model. Such modelling is further described with reference to 'determining metadata'.

It will be appreciated that the audio object may be placed at a specific position in the acoustic scene 400 which, by way of the geometric alignment between the acoustic scene 400 and the visual component of the visual environment, causes the audio object to be aligned with the imaged walls of the imaged room. It is noted that the desired position of the audio object may be established in various ways, as for example further described with reference to 'linking metadata to image data'.

The audio object may be assigned one or more acoustic properties that causes the audio object to interact with soundwaves in the acoustic scene 400. For example, the audio object may cause soundwaves to be reflected while attenuating their amplitude and thereby having at least in part absorbent acoustic properties. The acoustic properties may accurately represent those of the real-life object, for example in terms of frequency-dependent attenuation, but may also be approximated or simply may be assigned a default or standard value. As a result, in FIG. 5B, the soundwaves 422 are shown to reflect off the walls of the audio object 430, thereby resulting in reflected soundwaves 432, 434, in at least a similar manner as they would be reflected during conversation in a real-life room. The user being provided with the audio captured by the virtual microphone 410 will thus hear the direct soundwaves 422, but also the soundwaves reflected off the walls of the audio object 430. This may, as also illustrated in FIG. 5C by way of an overlay of the acoustic scene 400 over the imaged room 105, provide a more realistic experience to the user as the acoustic scene will be perceived to (better) match the visual rendering being displayed to the user.

The following discusses various aspects of the above modelling of imaged objects and their reproduction as audio objects in an acoustic scene.

'Recording the image'—the imaged object may be part of an imaged scene. The scene may have a default orientation within the image, which may facilitate the metadata being spatially linked to the image data. For example, if the imaged scene is part of an omnidirectional image, the scene may have a default orientation within the canvas of the omnidirectional image. This default orientation is also known as 'default pose', 'initial pose', 'initial orientation', etc., and is normally dependent on the projection format by which the scene is represented in the image. For an equirectangular projection, the default is that the vertical middle of the image denotes north or 0 degrees, and that the horizontal middle (the equator) is the horizontal 0 degrees. MPEG has also defined a default orientation for a cube map format, e.g., as defined by MPEG OMAF FDIS [6]. Within the projection, the default projection direction may then be changed by rotations on the x, y and z axis, e.g., by the parameters:

centre_azimuth, e.g., horizontal rotation from −180° to 180° centre_elevation, e.g., looking up/down, from −90° to +90° center_tilt, e.g., tilting the head, from −180° to 180°

Alternatively, the rotation may be specified in degrees of yaw, pitch, roll, which may be similar to how Google spatial metadata for spherical video defines a rotation in its projection header box (yaw, pitch, roll in degrees) or how A-Frame [7] defines its initial camera position (rotation in degrees on x, y and z axis). It is noted that the above may require an agreed-upon axis system, e.g., as defined by MPEG OMAF.

'Determining metadata'—the metadata modelling the object may be generated in various ways. In some embodiments, the metadata may be generated manually, e.g., using a content authoring workstation. For example, if the object is a room, a content author (user) may specify parameters defining a simple box model of the room and indicate the capture position of the camera within this room.

A room model may be described as metadata, e.g. as defined in [1]. In a specific example, the metadata may define the following parameters Dimensions
width in meters, e.g., width=4
height in meters, e.g., height=2.5
depth in meters, e.g., depth=5
Materials
left wall material as a string, e.g., left=brick-painted
right wall material as a string, e.g., right=curtain-heavy front wall material as a string, e.g., front=brick-bare back wall material as a string, e.g., back=glass-thick up (ceiling) as a string, e.g., up=wood-ceiling down (floor) as a string, e.g., down=linoleum-on-concrete The metadata may also specify the camera position within the room, thereby effectively indicating how the room is positioned in the image. For that purpose, the following parameters as defined by [1] may for example be used:

listenerPosition (x, y, z) where x-axis=left/right (width), y-axis=forward/backward (depth) and z-axis=up/down (height) with respect to the room's center. A specific example is listenerPosition=(0, 1, 0.5)

Additionally or alternatively to modeling the object manually, the modelling of the object may be based at least in part on an image analysis or computer vision technique. Such techniques may be applied to the image data of the object. In some embodiments, the image data may be accompanied by depth information, such as a second image providing a stereoscopic perspective of the object or a depth map. In such cases, the depth information may be analyzed instead of, or in addition to, the image data. In general, it is known per se to detect objects in images. For example, using computer vision techniques, walls, corners, the floor and the ceiling may be detected in an image. From such detection, the relative dimensions of a room may be determined. Similarly, objects in the scene may be recognized, such as a table, chair, person, plant, etc. Having identified the object, a geometric description of the object may be generated, for example by further analyzing the image data, or by selecting a default geometry from a database which corresponds to the type of object and possibly adapting the selected default geometry to the imaged object, e.g., in terms of size.

The metadata may also provide a more complex geometric modelling of the object. For example, the metadata may comprise a LIDAR scan of the outside of the object (or if the object is a room or similar structure, of the inside of the object) which may be provided as LAS data [8], or a modelling which in terms of complexity is in between a box model and a LIDAR scan, for example, as defined in MPEG-4 [4][5].

'Linking the metadata to the image data'—the metadata may be aligned with the image data so as to enable the audio object to be established within the acoustic scene at a position, orientation and/or size which at least approximately matches the imaged version of the object perceived by the user in terms of position, orientation and/or size. Such alignment typically allows coordinates in the metadata to be matched to image-based axis and vice versa, either by direct conversion of the axis systems or by the provision of a spatial transformation. In general, such direct or indirect alignment is also referred to as 'establishing a spatial correspondence'.

For that purpose, coordinates in the metadata may use the axis system associated with the image data. This may be advantageous if for example the metadata is supplied with the image data, e.g., as part of a same data container. In such cases, a same 'default orientation' may be used or assumed, e.g., (0, 0, 0).

However, if the metadata and the image data are not yet aligned, they may be aligned in various ways. For example, a rotation may be defined which is to be applied to the image-based coordinates so as to correct for the misalignment. Such type of rotation is defined by, e.g., MPEG OMAF. Another example is that a rotation may be defined which is to be applied to coordinates of the metadata, e.g., as described in [1]. Such a rotation may be defined by two vectors, e.g., a 'forward' vector and an 'up' vector. Each vector may be defined by values for x, y, and z to define its direction. The two vectors together may then define the orientation of the metadata with respect to the image data. Yet another example is that the coordinates of the metadata may be converted so as to express these coordinates in the image-based coordinates. For example, for a 90-degree rotation of room coordinates, e.g., causing 'front wall' to become 'left wall', the width and depth dimensions may be switched, so that front wall becomes left wall, left wall becomes back wall, back wall becomes right wall and right wall becomes front wall. The camera position in the metadata may be adjusted correspondingly. Yet another example is that a rotation may be applied to both the image-based coordinates and the coordinates in the metadata. Yet another example is that the image-based coordinates may be rotated, while the coordinates in the metadata may be converted to the rotated image-based coordinates.

'Insert audio source in scene'—with reference to the rendering of the acoustic scene, an audio source may be placed in the acoustic scene using for example the techniques described in [1]. Accordingly, the audio source may be positioned and possibly oriented within the acoustic scene, which may be defined for example by: Source position (x, y, z), e.g., position=(1, 2, 0.4)

Source orientation as vector forward (x, y, z) and vector up (x, y, z), e.g., orientation=(0.5, 0.5, 0, 0, 0, 1)

In another example, when using A-Frame [7], the audio source may be added as a component to any entity, which may be visible or not, and may then placed in the scene with a position and possibly a rotation, for example as:

<a-entity position="1, 2, 0.4" rotation="-45 0 0"></a-entity>

It is noted in addition to a position and a direction (orientation), also other audio characteristics may be assigned to the audio source, such as gain and source width. These characteristics may be defined by metadata accompanying the audio data, which metadata may be different from the metadata modelling the imaged object.

'Process audio based on metadata'—this refers to the establishing of the audio object in the acoustic scene and the subsequent acoustic rendering of the scene taking into account the acoustic properties of the audio object. Both steps are supported by audio frameworks such as [1], while examples of the rendering of acoustic scenes taking into account such audio objects are described in, e.g., [2] and [3]. In general, such rendering of the acoustic scene involves calculating reflections and/or adding reverb to the audio source based on the geometry of the audio object, the acoustic properties of the audio object, and the relative position of the audio object within the acoustic scene, in particular with respect to the audio source.

As another example besides the use of [1], one may make use of MPEG 4 AudioBIFS version 2 as described for example in [5], which uses VRML (Virtual Reality Modelling Language, ISO/IEC 14772). For example, a room may be modelled by constructing the walls, floor and ceiling as so-termed IndexedFaceSet2D nodes, which may each be given an AcousticMaterial property specifying the sound reflectivity of each surface. Or, the room or object may be described as a set of vertices using the regular IndexedFaceSet. Further, a ListenerPosition may be specified as well.

As coordinate system, an orthogonal righthanded Cartesian coordinate system may be used with meters as the unit. In the aforementioned example of a room, the walls, floor, ceiling, etc. may be defined by listing their coordinates in the coordindex, which is essentially an array of integers. For example, for a room of 4 by 4 by 2.5 meters, this may be done by specifying the four corner points per wall (and floor, ceiling), in the following illustrated for one wall:

```
geometry            IndexedFaceSet {
    coord               Coordinate {
                            point      [ –2 2 0,
                                         2 2 0,
                                         2 2 2.5,
                                        –2 –2 2.5]
                }
    coordIndex          [ 0, 1, 2, 3, –1 ]
    solid               FALSE
}
```

Next, the sound reflectivity may be specified by using the reffunc and refFrequency fields. As explained in the MPEG specification: "If refFrequency is an empty vector, reffunc is a system function representation of a linear, time-invariant system, the reflectivity transfer function of a digital filter for that material. If refFrequency is different from an empty vector, the semantics of the reffunc is different than described above. In this case refFrequency specifies a set of frequencies (in Hz) at which the gains in reffunc field are valid; The filter applied to sound when it is reflected off this surface implements a frequency magnitude response where at the given frequencies (in refFrequency field) the gains in reffunc field are valid."

For example, the refFrequency may be [250 1000 2000 4000] and the reffunc may then be [0.75 0.9 0.9 0.2]. The listening-point is normally slaved to the viewpoint, but may be defined separately as a position and orientation using ListeningPoint. The position may be defined by 3 floats, orientation may be defined by 4 floats, the first 3 defining the rotation axis and the last one the rotation itself.

'Rendering'—both the acoustic scene and the visual component of the virtual reality environment may be rendered and then provided to a user, for example by displaying images representing the virtual environment on a VR headset worn by a user and by outputting the rendered audio to headphones worn by the user. Such visual rendering and acoustic rendering is known per se in the art.

A specific example may be the following, in which it is assumed that the imaged object is a roughly square room. The image may have an initial orientation, which may be the middle of the equirectangular picture and the equator may be assumed to be level in the image.

Accordingly, an axis system may be associated with the image. The initial orientation of the image may be towards a wall B of the room (walls numbered in sequence A (front), B (right), C (back), D (left)). The room may be modelled by a square comprised of 4 walls which may be provided with a floor and a ceiling. When establishing the room as an audio object in the acoustic scene on the basis of the modelling of the room, it may be desirable that:
  the size of the audio object is similar to the imaged room, e.g., its length and width and height being at least roughly similar.
  the position of the virtual camera in the image is indicated, for example, by indicating a height and its horizontal placement, for example, indicating placement in the middle of the room, near a wall, in the corner, etc.
  the orientation of the audio object corresponds with that of the imaged room in the image, e.g., the initial orientation is the same.

In a more specific example, if an omnidirectional image is acquired of a square room of 4 by 4 meters and 2.5 meters in height with a camera which is positioned at a height of 1.5 meters placed near one corner at about 1 meter from both walls and pointing toward the right far wall (e.g., wall B), the metadata may be described:
  A 'zero' position from which the object may be defined. For example, the zero position may be (0,0,0) (in left/right, forward/backward, down/up axis). The zero position may have a predefined meaning, such as the zero position representing the center of the room.
  Next, the walls of the room may be defined, for example by defining a frontal wall (A) of 4 by 2.5 meters, with 'frontal' being defined as having a 90-degree angle towards the initial orientation. As such, this wall may be defined by coordinates (–2, 2, –1.25) to (2, 2, 1.25).
  Next, wall B may be defined as (2, 2, –1.25) to (2, –2, 1.25), e.g., by being attached to the right-hand side of the frontal wall A, etc., etc. The floor and ceilings of the room may be defined in a same or similar manner.
  Next, the camera position may be defined, for example as (–1, –1, 0.25).
  And the camera orientation may be defined, for example as (1, 0, 0).

Another specific example may be an VR conference between two users, further referred to as 'Alice' and 'Bob'. Their meeting may take place in a virtual living room which may be represented by a static 360-degree photo of an actual living room. Their VR conference service may be based on A-Frame [7] for creating the virtual reality environment and Google Resonance [1] for audio rendering. Bob may be using an HMD such as the Oculus Rift and may be using the microphone built into the HMD for recording his audio. This may result in an adequate anechoic recording of his voice.

From the perspective of Alice:
  An image of the living room may be available in equirectangular format, which may be accompanied by metadata containing a geometric description of the living room using the attributes defined in Google Resonance. This description may have been provided manually, e.g., by the room having been measured when the photo was taken.
  In A-frame, the photo of the living room may be placed on a sphere using the <a-sky> tag.
  The metadata received with the image may be used in Google Resonance to set the room properties, thereby creating an audio environment which reflects the image of the living room, e.g., using the <a-resonance-audio-room> tag.
  The video of Bob, which may be received through a WebRTC connection, may be placed in the scene using the <a-video> tag as a 'video avatar'. The position and orientation of the video may be pre-configured by the VR conference framework to fit the scene and in particular to provide a natural experience. For example, the video avatar of Bob may be displayed sitting on an available couch space.
  The audio of Bob, which may also be received through the WebRTC connection, may be placed as a resonance object in the scene, using resonance-audio-src. The audio object may be positioned in the center of the video object so that Alice will hear Bob's audio from the direction in which she sees Bob in the virtual reality environment.

A-Frame and Google Resonance may then render the virtual environment, e.g., by rendering the imaged room and video avatar of Bob and the audio data of Bob. Alice may be provided with the rendered output, by which Alice may see a virtual living room containing Bob, while hearing Bob from the corresponding direction. Alice will perceive, consciously or otherwise, the reverberant properties of the room in the audio.

FIG. 6 shows an acoustic scene 400 which comprises an audio object 440 representing a modelling of an imaged object other than a room. Namely, although so far described for an imaged room which shown in an omnidirectional image, any image-based representation of an object may be modelled and represented by an audio object in the acoustic scene. For example, in AR, it may desirable to overlay an image-based representation of a historic city wall over the structures or spaces having taken the wall's place. As audio source 420, a voice of a presenter may be provided explaining the history behind the city wall. Also here, it may be desirable to adapt the acoustic rendering of the voice of the presenter to the image-based representation of the object, e.g., the city wall. This is shown schematically in FIG. 6 by a wall-type structure 440 reflecting soundwaves 442 originating from the audio source 420 representing the presenter's voice. It will be appreciated that instead of a wall, any image-based object may be modelled. The visual rendering may be in VR or AR.

Figure 7:
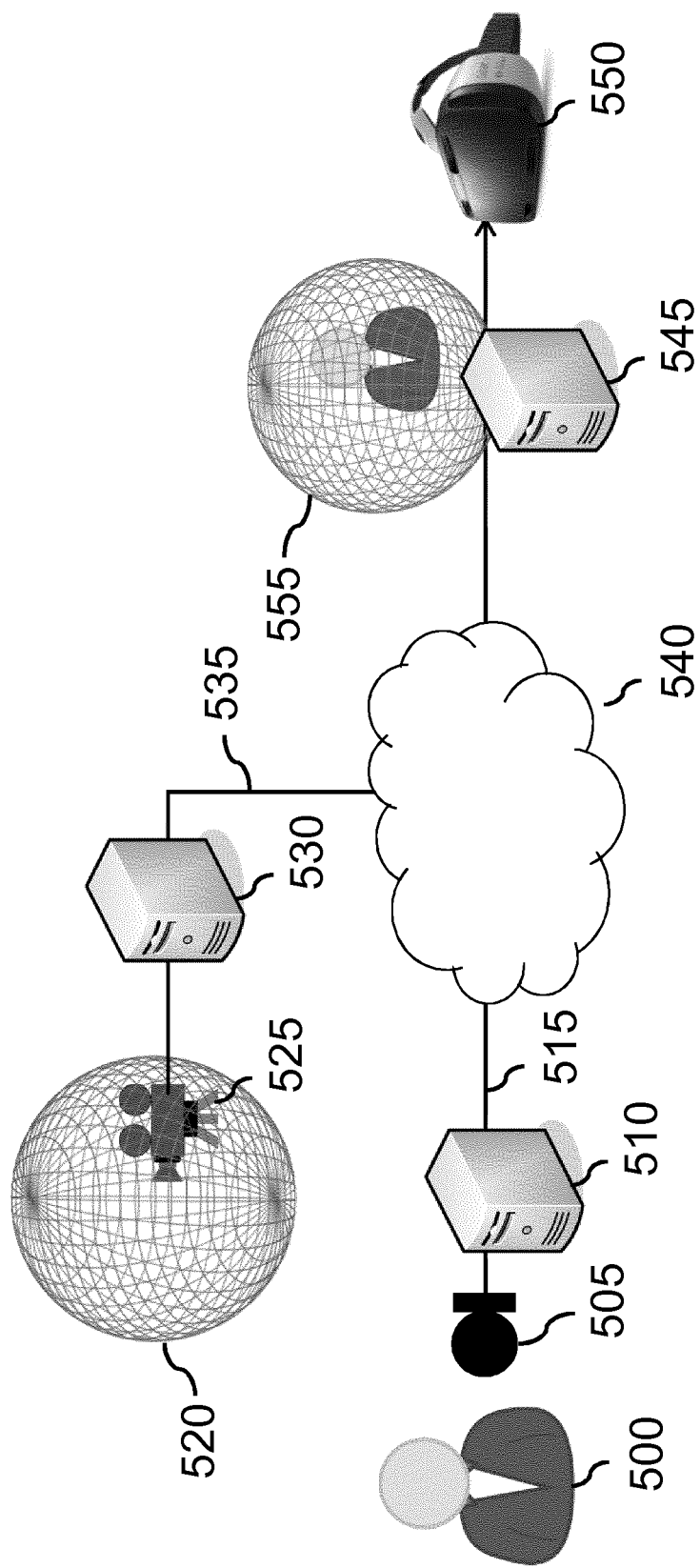
FIG. 7 shows various entities involved in a multiuser communication session in virtual reality, such as processor systems of remote and local users.

FIG. 7 shows various entities involved in a multiuser communication session in virtual reality, such as processor systems of remote and local users. Here, the adjectives 'remote' and 'local' merely denote the perspective in the following explanation: the 'remote' user is the participant for which the audio capture is described, and the 'local' user is the participant for which the acoustic and visual rendering of the virtual reality environment is described. In other words, the experience is described in the following from the perspective of the so-termed 'local' user.

In the example of FIG. 7, the remote user's 500 speech may be captured by a microphone 505 connected to a remote processor system 510, which may transmit the captured audio data 515 to a cloud-based server (not shown) hosted in a network 540. Previously, a real-life scene 520 may have been captured by a camera 525. The image data of the real-life scene may be provided by a processor system 530 together with metadata describing a geometry of one or more objects in the scene. For example, the processor system 530 may represent a content authoring workstation allowing a user of the workstation to manually generate the metadata. In an alternative embodiment, the processor system 530 may (semi)automatically generate the metadata using an image analysis and/or computer vision technique. The image and metadata 535 may then be provided together, e.g., in a same data container, to the cloud-based server, which server may then, before start of the communication session, provide the image data and metadata to a processor system 545 of a local user. The processor system 545 of the local user may then render the virtual reality environment by inserting an avatar representing the remote user 500 in the virtual reality environment and projecting the imaged scene onto a sphere surrounding the avatar, thereby establishing a 'backdrop' for the VR session. The rendered video and audio may then be provided via an HMD 550 and headphones or other types of speakers (not shown explicitly in FIG. 7) to the local user, with the acoustic rendering being adjusted based on the metadata as described elsewhere in this specification.

Figure 8:
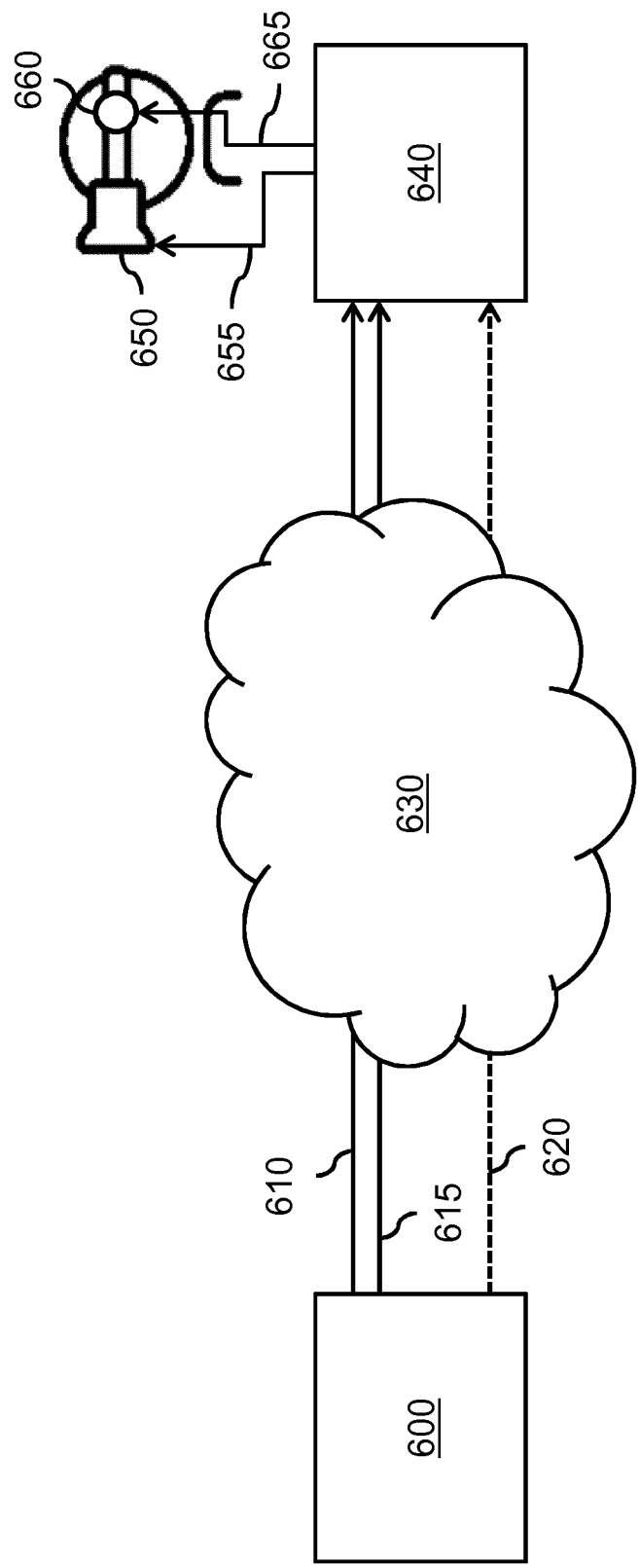
FIG. 8 illustrates data communication between a server and a processor system configured for establishing the visual rendering and the acoustic rendering.

FIG. 8 illustrates data communication between a server 600 and a processor system 640 configured for establishing the visual rendering and the acoustic rendering. The server 600, which may be a cloud-based server, may provide image data 610 representing an imaged object or scene to the processor system 640, e.g., via a network 630 such as the Internet. In addition, the server 600 may provide metadata 620 to the processor system 640 representing a modelling of the imaged object. For example, the metadata 620 may be provided as part of a same media stream as the image data 610, in a header of the image data 610, etc. Alternatively, the metadata 620 may be provided separately to the processor system 640, e.g., as a separate data container and/or by a separate entity, such as a cloud-based database. In yet another alternative embodiment, the metadata 620 may be generated by the processor system 640 rather than being received from another entity. FIG. 8 shows the server 600 further providing audio data 615 to the processor system 640. It will be appreciated that the audio data 615 may also be provided by another entity to the processor system 640.

Upon receiving the image data 610, the metadata 620 and the audio data 615, the processor system 640 may establish the visual rendering and the acoustic rendering in a manner as described elsewhere in this specification. The processor system 640 may then output the resulting rendered image data 655 to an HMD 650 worn by a user and the rendered audio data 665 to headphones 660 worn by the user.

Various other alternatives to the FIGS. 7 and 8 embodiments are equally conceivable. For example, besides multiuser communication, embodiments may involve, for example, a VR music application in which one may listen to music in a favorite image-based scene and in which the music 'reflects off' one or more objects in the scene. Yet another example is an instruction video in which an instructor, represented by a video avatar, is placed in a certain image-based scene, etc.

It will be appreciated that any references to an image-based representation of an object or a scene equally apply to the object or scene being represented by series of images, e.g., a video. In case of video, the metadata may be updated, for example, by updating and sending the updated metadata, or by sending an update to already supplied metadata, such as a new position of the object or the camera.

It is noted that an imaged object may be part of a scene which is imaged. For example, the image shown in FIG. 1 is shown to comprise further objects than the room itself, such as a table. However, in some embodiments, image data may be available which only represents the imaged object, e.g., in a segmented form.

Figure 9:
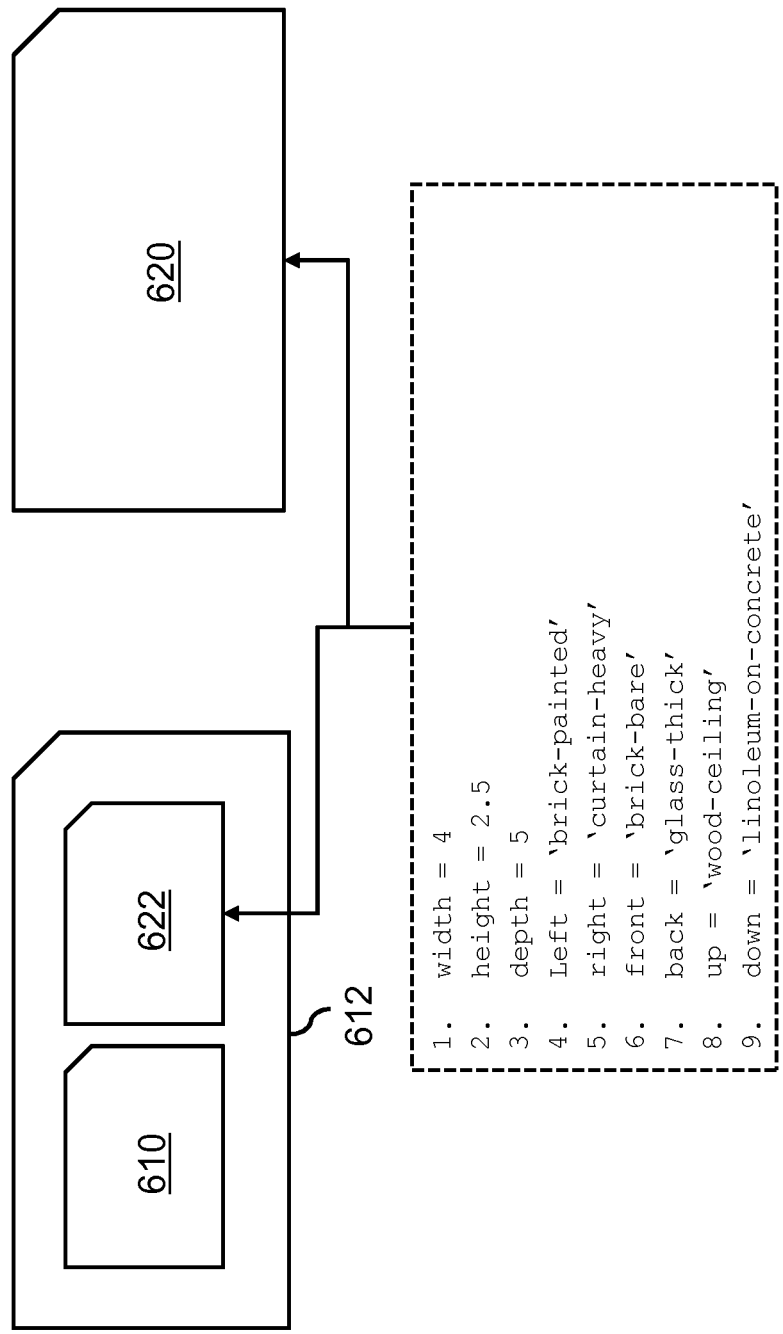
FIG. 9 shows metadata representing a modelling of an imaged object, being in this example a modelling of a room by way of a box model.

FIG. 9 shows metadata 620, 622 representing a modelling of an imaged object, being in this example a modelling of a room by way of a box model. The metadata may be part of a same data container 612 as the image data 610, for example a same file or media stream, but may also be provided as separate metadata 620 which can be associated with the image data 610. For example, the metadata may contain an identifier of the data container of the image data 610 of the object, such as an URL, thereby allowing the metadata to be retrieved and associated with the image data. Yet another example is that the metadata may be included in a manifest file which is associated with the image data, or that it may be included in a service announcement, e.g., in an EPG. Various other means of association are equally conceivable. For example, in some embodiments, the image data 610 may link to the metadata 620, e.g., by containing an URL at which the metadata 620 is accessible.

Figure 10:
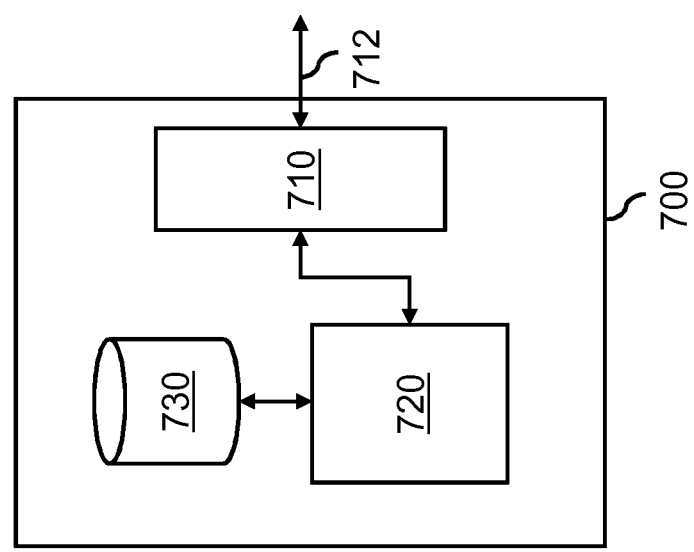
FIG. 10 shows a processor system for generating the metadata.

FIG. 10 shows a processor system 700 for generating the metadata. For that purpose, the processor system 700 is shown to comprise a processor 720 which may be configured, e.g., by hardware design or software, to perform operations described with reference to FIG. 5B-9 and elsewhere pertaining to the generating of the metadata. For example, the processor 720 may be configured to apply an image analysis and/or computer vision technique to an image-based representation of an object so as to obtain a modelling of the object. For example, the processor 730 may be embodied by a single Central Processing Unit (CPU), but also by a combination or system of such CPUs and/or other types of processing units. The processor system 700 is further shown to comprise a data storage 730, such as internal memory, a hard disk, a solid-state drive, or an array thereof, which may be used to store or buffer data, such as the image data of the imaged object and/or the metadata. FIG. 10 further shows the processor system 700 to comprise a communication interface 710, which may be any suitable type of interface for outputting data 712 such as the metadata. For example, the communication interface 710 may be a storage interface or a network interface. Examples of the latter include, but are not limited to, a wireless network interface, e.g., based on Wi-Fi, Bluetooth, ZigBee, 4G or 5G mobile communication, or a wired network interface, e.g., based on Ethernet or optical fiber. For example, the communication interface 710 may be a local area network (LAN) network interface, or a network interface to a wide area network (WAN) such as the Internet.

The processor system 700 may be embodied by a (single) device or apparatus. For example, the processor system 700 may be embodied by a server, workstation, personal computer, etc. In some embodiments, the processor system 700 may be an end-user device, for example (integrated into) the same device as described with reference to FIG. 11 which is configured for establishing the acoustic rendering. Examples of such devices include, but are not limited to a smartphone, personal computer, laptop, tablet device, gaming console, set-top box, television, monitor, projector, smart watch, smart glasses, media player, media recorder, head mounted display device, etc. The processor system 700 may also be embodied by a distributed system of such devices or apparatuses. An example of the latter may be the functionality of the processor system 700 being at least in part distributed over network elements in a network.

Figure 11:
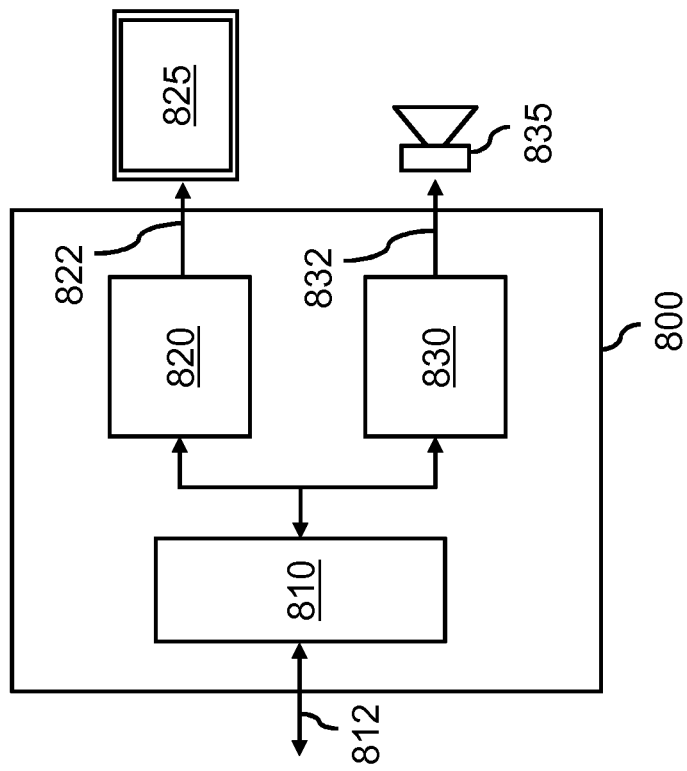
FIG. 11 shows a processor system configured for establishing the acoustic rendering based on the metadata, and optionally the visual rendering.

FIG. 11 shows a processor system 800 configured for establishing the acoustic rendering based on the metadata. The processor system 800 may implement part or all of the 'render side' functionality as described with reference to FIGS. 1-9 and elsewhere. The processor system 800 is shown to comprise a communication interface 810 which may be configured to receive data 812 which includes at least the audio data and the metadata and optionally the image data. The communication interface 810 may be any suitable type of interface for receiving said data, including but not limited to a storage interface or network interface as described with reference to FIG. 10. The processor system 800 is further shown to comprise an audio processor 830 which may be configured, e.g., by hardware design or software, to perform operations described with reference to FIG. 1-9 and elsewhere pertaining to the rendering of the acoustic scene. In some embodiments, the audio processor 830 may directly output a speaker signal 832 to a speaker 835, e.g., a loudspeaker, loudspeaker system, or (stereo) headphone. In other embodiments, the audio processor 830 may rather output rendered audio data which may be output to the speaker 835 by another component or another entity.

As an optional component, the processor system 800 may comprise a video processor 820 which may be configured, e.g., by hardware design or software, to perform operations described with reference to FIG. 1-9 and elsewhere pertaining to the visual rendering of image data. In some embodiments, the video processor 820 may directly generate and output display data 822 to a display 825 such as an HMD. In other embodiments, the video processor 820 may output rendered video data which may be output to the display 825 by another component or another entity.

The video processor 820 and the audio processor 830 may each or together be embodied by a single Central Processing Unit (CPU), but also by a combination or system of such CPUs and/or other types of processing units.

Although not shown in FIG. 11, the processor system 800 may also comprise a data storage, such as internal memory, a hard disk, a solid-state drive, or an array thereof, which may be used to buffer data, e.g., the received audio data, the received metadata and/or the optionally received image data.

The processor system 800 may be embodied by a (single) device or apparatus. For example, the processor system 800 may be embodied as smartphone, personal computer, laptop, tablet device, gaming console, set-top box, television, monitor, projector, smart watch, smart glasses, media player, media recorder, head mounted display device, etc. The processor system 800 may also be embodied by a distributed system of such devices or apparatuses. An example of the latter may be the functionality of the processor system 800 being distributed at least in part over network elements in a network.

In general, the processor system 700 of FIG. 10 and the processor system 800 of FIG. 11 may each be embodied as, or in, a device or apparatus. The device or apparatus may comprise one or more (micro)processors which execute appropriate software. The processors of either system may be embodied by one or more of these (micro)processors. Software implementing the functionality of either system may have been downloaded and/or stored in a corresponding memory or memories, e.g., in volatile memory such as RAM or in non-volatile memory such as Flash. Alternatively, the processors of either system may be implemented in the device or apparatus in the form of programmable logic, e.g., as a Field-Programmable Gate Array (FPGA). Any input and/or output interfaces may be implemented by respective interfaces of the device or apparatus, such as a network interface. In general, each unit of either system may be implemented in the form of a circuit. It is noted that either system may also be implemented in a distributed manner, e.g., involving different devices.

Figure 12:
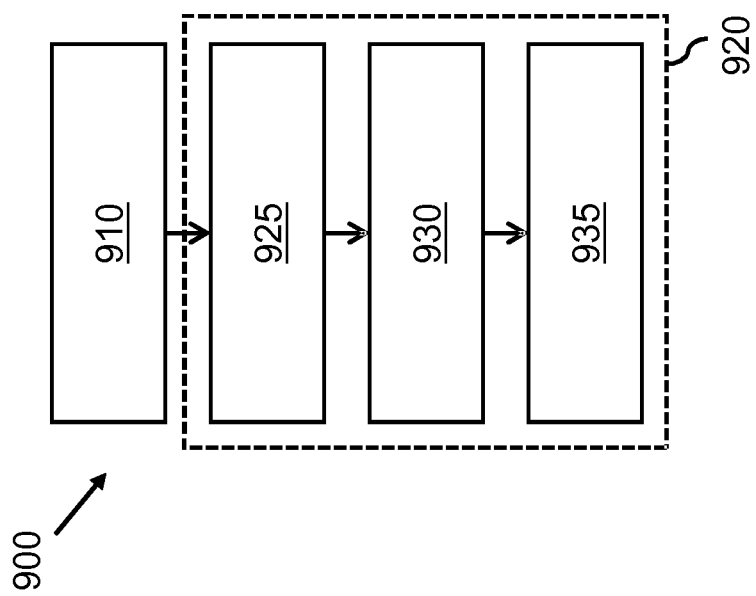
FIG. 12 shows a method of adapting an acoustic rendering of an acoustic scene to a visual rendering comprising an imaged object.

FIG. 12 shows a method 900 of adapting an acoustic rendering of an acoustic scene to a visual rendering comprising an imaged object. The method may comprise, in a step titled "GENERATING METADATA", generating 910 metadata associated with the image-based representation of the object, the metadata representing a modelling of the object. The method may further comprise, in a step titled "ESTABLISHING ACOUSTIC RENDERING", establishing 920 the acoustic rendering of the audio source by, in a sub-step titled "PROVIDING SPATIAL AUDIO SOURCE", providing 925 the audio source as a spatial audio source in an acoustic scene, the acoustic scene being geometrically aligned with the visual rendering of the object, in a sub-step titled "ESTABLISHING IMAGED OBJECT AS AUDIO OBJECT", on the basis of the metadata, establishing 930 the object as an audio object in the acoustic scene, the audio object having a reverberant and/or absorbent acoustic property, and in a sub-step titled "RENDERING ACOUSTIC SCENE", rendering 935 the acoustic scene using a spatial audio rendering technique while adapting the rendering of the acoustic scene to the reverberant and/or absorbent acoustic property of the audio object. It will be appreciated that the steps of the method may be performed by a same entity but also by different entities. A non-limiting example is that step 910 may be performed by a first processor system which generates and transmits the metadata to a second processor system which performs steps 920-935.

Figure 13:
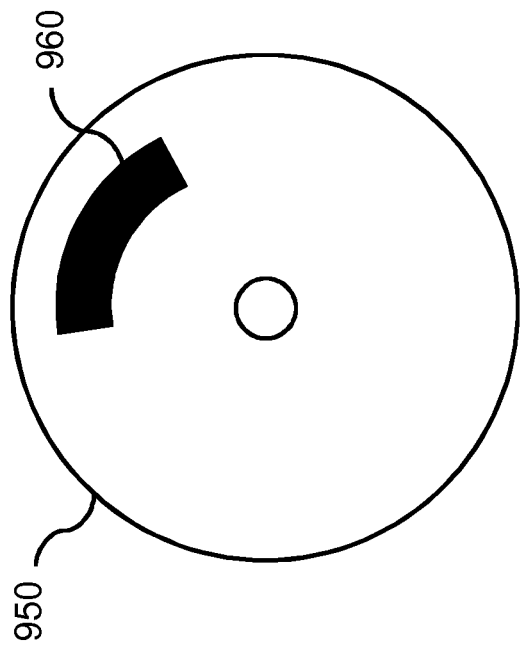
FIG. 13 shows a computer-readable medium comprising non-transitory data.

It is noted that any of the methods described in this specification, for example in any of the claims, may be implemented on a computer as a computer implemented method, as dedicated hardware, or as a combination of both. Instructions for the computer, e.g., executable code, may be stored on a computer readable medium 950 as for example shown in FIG. 13, e.g., in the form of a series 960 of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 13 shows by way of example an optical storage device 950.

Figure 14:
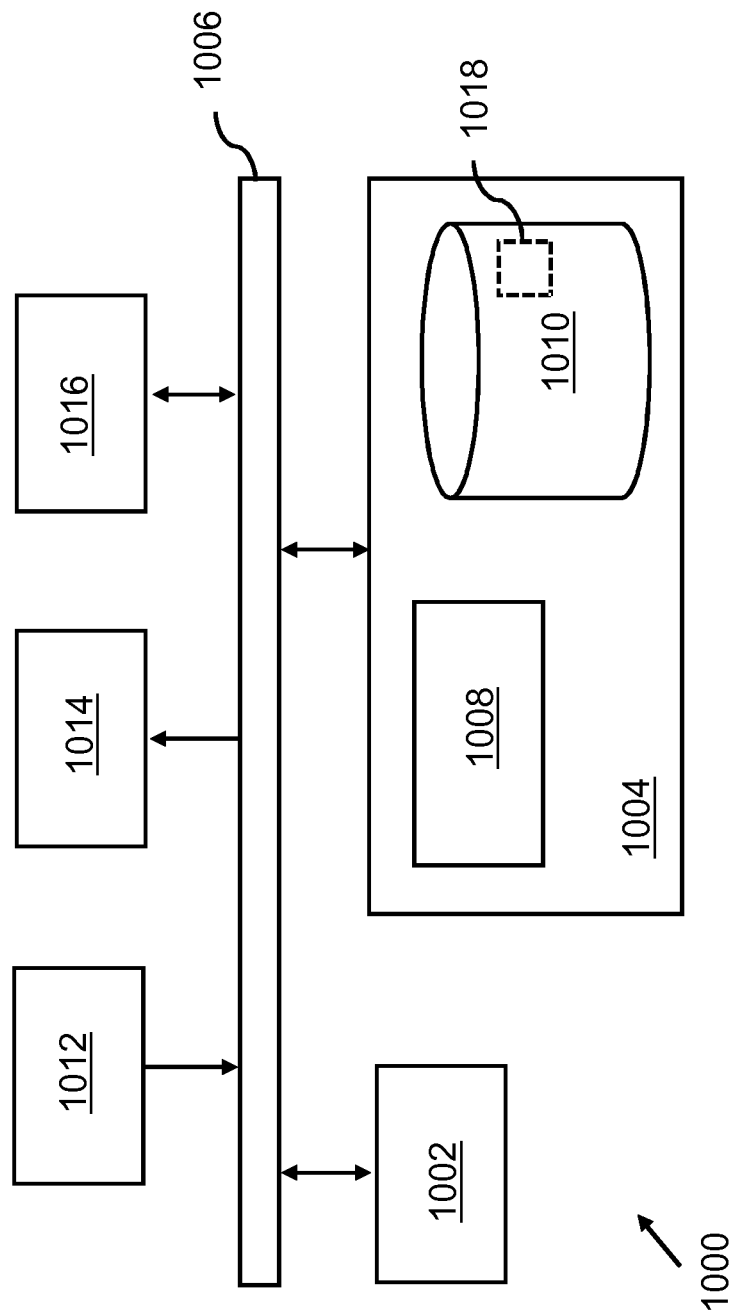
FIG. 14 shows an exemplary data processing system.

FIG. 14 is a block diagram illustrating an exemplary data processing system 1000 that may be used in the embodiments described in this specification. Such data processing systems include data processing entities described in this specification, including but not limited to the processor systems of FIGS. 7-11 and others.

The data processing system 1000 may include at least one processor 1002 coupled to memory elements 1004 through a system bus 1006. As such, the data processing system may store program code within memory elements 1004. Furthermore, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

The memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The data processing system 1000 may also include one or more cache memories (not shown) that provide temporary storage of at least some program code in order to reduce the number of times program code is otherwise retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, and a gesture-based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 14, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

For example, data processing system 1000 may represent a processor system as described with reference to FIGS. 6-9 and others. In that case, application 1018 may represent an application that, when executed, configures data processing system 1000 to perform the functions described with reference to said entity. Such functions may include functions described with reference to FIGS. 1-5C and others.

REFERENCES

[1] Google Resonance, https://developers.google.com/resonance-audio/[2]
[2] Svensson, U. P. (2002, November). Modelling acoustic spaces for audio virtual reality. In Proceedings of the IEEE Benelux Workshop on Model Based Processing and Coding of Audio (pp. 109-116).
[3] Coleman, P., Franck, A., Jackson, P. J., Hughes, R. J., Remaggi, L., & Melchior, F. (2017). Object-based reverberation for spatial audio. Journal of the Audio Engineering Society, 65(1/2), 66-77.
[4] Scheirer, E., Huopaniemi, J., & Väänänen, R. (1998, November). AudioBIFS: The MPEG-4 standard for effects processing. In Proc. DAFX98 Workshop on Digital Audio Effects Processing.
[5] Scheirer, E. D., Vaananen, R., & Huopaniemi, J. (1999). AudioBIFS: Describing audio scenes with the MPEG-4 multimedia standard. IEEE Transactions on Multimedia, 1(3), 237-250.
[6] ISO/IEC FDIS 23090-12:201x, Information technology—Coded representation of immersive media (MPEG-I)—Part 2: Omnidirectional media format, 2017-12-11
[7] A framework for WebVR: https://aframe.io/[8]
[8] Format for providing LIDAR data: http://www.asprs.org/a/society/committees/standards/LAS_1_4_r13.pdf In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of adapting an acoustic rendering of an audio source to a visual rendering of an object in a scene, wherein the visual rendering is provided to a user, wherein the visual rendering is a virtual-reality rendering of an image-based representation of the object in a virtual-reality scene, wherein the virtual-reality scene is associated with a first axis system, wherein the virtual-reality scene has a default orientation in the first axis system, the method comprising:

generating metadata associated with the image-based representation of the object, the metadata representing a modelling of the object, wherein the metadata comprises one or more coordinates defining at least part of a geometry of the object as coordinates in a second axis system which is different from the first axis system, wherein generating the metadata comprises:

determining a spatial correspondence between the first axis system and the second axis system; and generating the metadata, or generating further metadata associated with the metadata, to indicate the spatial correspondence;

establishing the acoustic rendering of the audio source by:

providing the audio source as a spatial audio source in an acoustic scene, the acoustic scene being geometrically aligned with the visual rendering of the object;

on the basis of the metadata, establishing the spatial correspondence between the first axis system and the one or more coordinates, and establishing the object as an audio object in the acoustic scene based on the spatial correspondence, the audio object having at least one of a reverberant acoustic property and an absorbent acoustic property; and rendering the acoustic scene using a spatial audio rendering technique while adapting the rendering of the acoustic scene to the at least one of the reverberant acoustic property and the absorbent acoustic property of the audio object.

2. The method according to claim 1, wherein the object is a room having at least one wall, and wherein the metadata defines at least part of a geometry of the room.

3. The method according to claim 1, wherein the virtual-reality scene is an omnidirectional image.

4. The method according to claim 1, wherein generating the metadata comprises defining the one or more coordinates in the first axis system.

5. The method according to claim 1, wherein generating the metadata comprises analyzing one or more of:
an image-based representation of the scene;
the image-based representation of the object; and
depth information associated with either image-based representation;
using an image analysis technique or a computer vision technique to obtain a modelling of the object.

6. The method according to claim 1, wherein generating the metadata comprises obtaining user input indicative of a geometry of the object via a user interface from a user.

7. The method according to claim 1, wherein generating the metadata comprises indicating the at least one of the reverberant acoustic property and the absorbent acoustic property by indicating a material of the object or by directly defining the at least one of the reverberant acoustic property and the absorbent acoustic property.

8. The method according to claim 1, further comprising generating the metadata at a server and providing the metadata to a receiver configured to establish the acoustic rendering of the audio source.

9. The method according to claim 1, wherein the audio source represents audio of a multiuser communication session, and wherein the virtual-reality scene represents a virtual setting of the multiuser communication session.

10. A non-transitory computer-readable medium comprising a computer program, the computer program comprising instructions for causing a processor system to perform the method according to claim 1.

11. A processor system for generating metadata for use in adapting an acoustic rendering of an audio source to a visual rendering of an object in a scene, wherein the visual rendering is
a virtual-reality rendering of an image-based representation of the object in a virtual-reality scene, wherein the virtual-reality scene is associated with a first axis system, wherein the virtual-reality scene has a default orientation in the first axis system
the processor system comprising:
a communication interface configured to communicate with a receiver which is configured to establish the acoustic rendering of the audio source by providing the audio source as a spatial audio source in an acoustic scene, the acoustic scene being geometrically aligned with the visual rendering of the object; and
a processor configured to:
generate metadata associated with the image-based representation of the object, the metadata representing a modelling of the object, wherein the metadata comprises one or more coordinates defining at least part of a geometry of the object as coordinates in a second axis system which is different from the first axis system, wherein the generating the metadata comprises to:
determine a spatial correspondence between the first axis system and the second axis system; and
generate the metadata, or generating further metadata associated with the metadata, to indicate the spatial correspondence; and
via the communication interface, provide the metadata to the receiver to enable the receiver to establish the spatial correspondence between the first axis system and the one or more coordinates, and to establish the object as an audio object in the acoustic scene based on the spatial correspondence, the audio object having at least one of a reverberant acoustic property and an absorbent acoustic property.

12. A processor system for adapting an acoustic rendering of an audio source to a visual rendering of an object, wherein the visual rendering is
a virtual-reality rendering of an image-based representation of the object in a virtual-reality scene, wherein the virtual-reality scene is associated with a first axis system, wherein the virtual-reality scene has a default orientation in the first axis system,
the processor system comprising:
a communication interface configured to receive metadata associated with the image-based representation of the object, the metadata representing a modelling of the object, wherein the metadata comprises one or more coordinates defining at least part of a geometry of the object as coordinates in a second axis system which is different from the first axis system, wherein the metadata comprises a spatial correspondence between the first axis system and the second axis system;
an audio processor configured to establish the acoustic rendering of the audio source by:
providing the audio source as a spatial audio source in an acoustic scene, the acoustic scene being geometrically aligned with the visual rendering of the object;
on the basis of the metadata, establishing the spatial correspondence between the first axis system and the one or more coordinates, and establishing the object as an audio object in the acoustic scene based on the spatial correspondence, the audio object having at least one of a reverberant acoustic property and an absorbent acoustic property; and rendering the acoustic scene using a spatial audio rendering technique while adapting the rendering of the acoustic scene to the reverberant and/or absorbent acoustic property of the audio object.

13. The processor system according to claim 12, further comprising a video processor configured to establish the visual rendering of the scene by providing one of the virtual-reality rendering and the augmented-reality rendering to the user.

14. The processor system according to claim 12, wherein the processor system is configured for participating in a multiuser communication session, wherein the spatial audio source represents audio of the multiuser communication session, and wherein the virtual-reality scene represents a virtual setting of the multiuser communication session.

* * * * *

UNITED STATES PATENT AND TRADEMARK OFFICE
CERTIFICATE OF CORRECTION

| | | |
|---|---|---|
| PATENT NO. | : 11,450,071 B2 | Page 1 of 1 |
| APPLICATION NO. | : 17/057434 | |
| DATED | : September 20, 2022 | |
| INVENTOR(S) | : Hans Maarten Stokking and Hendrikus Nathaniël Hindriks | |

It is certified that error appears in the above-identified patent and that said Letters Patent is hereby corrected as shown below:

On the Title Page

In Item (71) Applicants: delete "NEDERLANDSE ORGANISATIE VOOR TOEGEPAST-NATUURWETENSCHAPPELIJK ONDERZOEK TNO, The Hague (NL)" and insert
-- NEDERLANDSE ORGANISATIE VOOR TOEGEPAST-NATUURWETENSCHAPPELIJK ONDERZOEK TNO, 's-Gravenhage (NL) --.

Signed and Sealed this
Twenty-second Day of November, 2022

Katherine Kelly Vidal
*Director of the United States Patent and Trademark Office*